(12) United States Patent
Ohto et al.

(10) Patent No.: US 6,577,308 B1
(45) Date of Patent: Jun. 10, 2003

(54) DATA PROCESSING METHOD AND APPARATUS AND INFORMATION FURNISHING MEDIUM

(75) Inventors: Yasunori Ohto, Tokyo (JP); Yuichi Ueda, Tokyo (JP); Kosuke Komatsu, Kanagawa (JP)

(73) Assignees: Sony Corporation, Tokyo (JP); Sony-Kihara Research Center Inc., Tokyo (JP)

(*) Notice: Subject to any disclaimer, the term of this patent is extended or adjusted under 35 U.S.C. 154(b) by 0 days.

(21) Appl. No.: 09/460,996

(22) Filed: Dec. 14, 1999

(30) Foreign Application Priority Data

Dec. 16, 1998 (JP) .......................................... 10-357261

(51) Int. Cl.⁷ ............................................... G06T 17/00
(52) U.S. Cl. ........................ 345/423; 345/473; 345/646
(58) Field of Search ................................. 345/423, 428, 345/419, 646, 473, 501, 619, 581; 382/103, 128

(56) References Cited

U.S. PATENT DOCUMENTS

| | | | | |
|---|---|---|---|---|
| 6,009,435 A | * | 12/1999 | Taubin et al. | 707/101 |
| 6,072,496 A | * | 6/2000 | Guenter et al. | 345/419 |
| 6,188,776 B1 | * | 2/2001 | Covell et al. | 382/100 |
| 6,262,739 B1 | * | 7/2001 | Migdal et al. | 345/423 |
| 6,272,231 B1 | * | 8/2001 | Maurer et al. | 382/103 |
| 6,300,956 B1 | * | 10/2001 | Apodaca et al. | 345/619 |
| 6,307,555 B1 | * | 10/2001 | Lee | 345/423 |
| 6,320,583 B1 | * | 11/2001 | Shaw et al. | 345/619 |

* cited by examiner

*Primary Examiner*—Mark Zimmerman
*Assistant Examiner*—Huedung X. Cao
(74) *Attorney, Agent, or Firm*—Bell Boyd & Lloyd

(57) ABSTRACT

In computer graphics, polygons constituting two polygon models are matched to realize spontaneous morphing. Each of first and second polygon models is split into corresponding parts, such as ear, eye or face, and polygons making up a part of the first polygon model are matched to polygons making up a part of the second polygon corresponding to the first-stated part. A connection relational graph, as a two-dimensional graph representing the connection relation between polygons making up the respective parts, is prepared from the two matched parts, and the connection relational graphs of the two matched parts are rendered co-morphic to match the polygons constituting the two parts.

26 Claims, 26 Drawing Sheets

PART

⇩ PLANE GRAPH

LINK
NODE

DATA PROCESSING METHOD AND APPARATUS AND INFORMATION FURNISHING MEDIUM

BACKGROUND OF THE INVENTION

1. Field of the Invention

This invention relates to a processing method and apparatus and information furnishing medium. More particularly, it relates to a processing method and apparatus and information furnishing medium in which different three-dimensional models are matched to each other to permit e.g., morphing to be carried out therebetween.

2. Description of the Related Art

In preparing an animation exploiting computer graphics, the processing of matching respective portions of two different three-dimensional models and allowing respective portions of one of the three-dimensional models to be gradually deformed to associated respective portions of the other three-dimensional model, that is the morphing, is used as an animation technique.

Among the methods for matching three-dimensional models, referred to below simply as models, there is such a method in which two models MA and MB, to be matched to each other, are projected on the same plane, such as a spherical plane, and respective portions of the two models are matched to each other on the projected plane, as shown in FIG. 1.

However, if two models are projected on e.g., a spherical surface, it is a frequent occurrence that irregularities on a model are overlapped on the projected spherical surface such that the texture or the material of the models are mixed to lead of the loss of the features peculiar to the models. Specifically, FIG. 2 shows the state of projection of a character (a character simulating a Piero in FIG. 2) on a spherical surface. In this case, left ears of the character are overlapped with a hat such that the features of the hat are lost. The same may be said of the right ears of the character. The result is that, even if it is desired to effect morphing to deform the hat portion to another shape as the features of the hat are maintained, such morphing is difficult to perform, such result that morphing cannot be performed spontaneously.

Recently, models are frequently defined by unit figures, termed polygons, such as triangles or squares. An animation constructed by a set of polygons, such as triangles or squares, is prepared by causing movement or deformation of polygons, such as by interpolation of neighboring keyframes. In an animation formulated from the keyframes (keyframe animation), it has been difficult to use an animation by morphing projected on a spherical surface (morphed animation) in a portion of the keyframe animation.

That is, in the keyframe animation, an animation between keyframes is prepared by interpolation, using a pre-rendering model. In the morphing by projection on the spherical surface, in which data following the rendering employing a model are projected on the spherical surface, it has been difficult to use the morphed animation, obtained as a result of morphing on the spherical surface, as a portion of the keyframe animation employing the pre-rendering model.

SUMMARY OF THE INVENTION

It is therefore an object of the present invention to provide a processing method and apparatus and information furnishing medium in which polygons constituting a model defined by a set of the polygons can be matched easily to one another to enable the animation to be realized more spontaneously.

In one aspect, the present invention provides a data processing apparatus for performing data processing of matching unit figures making up a first three-dimensional model and unit figures making up a second three-dimensional model, including part splitting means for splitting each of the first and second three-dimensional models into corresponding parts, unit figure matching means for matching unit figures making up the first three-dimensional model and unit figures making up the second three-dimensional model, and reconstructing means for reconstructing the parts obtained from unit figure matching into the first and second three-dimensional models.

In still another aspect, the present invention provides a data processing method for performing data processing of matching unit figures making up a first three-dimensional model and unit figures making up a second three-dimensional model, including a part splitting step of splitting each of the first and second three-dimensional models into corresponding parts, a unit figure matching step of matching unit figures making up the first three-dimensional model and unit figures making up the second three-dimensional model and a reconstructing step of reconstructing the parts obtained from unit figure matching into the first and second three-dimensional models.

In still another aspect, the present invention provides a information furnishing medium for furnishing the control information for causing an information processing apparatus to perform data processing of matching unit figures making up a first three-dimensional model and unit figures making up a second three-dimensional model, wherein the information furnishing medium furnishes the control information includes a part splitting step of splitting each of the first and second three-dimensional models into corresponding parts, a unit figure matching step of matching unit figures making up a part of the first three-dimensional model and unit figures making up a part of the second three-dimensional model, and a reconstructing step of reconstructing the parts obtained from unit figure matching into the first and second three-dimensional models.

In still another aspect, the present invention provides a information furnishing medium for furnishing the results of data processing of matching unit figures making up a first three-dimensional model and unit figures making up a second three-dimensional model, wherein the information furnishing medium furnishes the results of reconstruction of the first and second three-dimensional models obtained on splitting the first and second three-dimensional models into corresponding parts, performing unit figure matching of matching unit figures constituting parts making up the first three-dimensional model to unit figures constituting parts making up the second three-dimensional model, and reconstructing the parts obtained from the unit figure matching into the first and second three-dimensional models.

In still another aspect, the present invention provides a data processing apparatus for performing data processing of formulating an animation from first and second three-dimensional models, each defined by an assembly of unit figures the apparatus includes unit figure matching means for performing unit figure matching of matching unit figures constituting the first three-dimensional model to unit figures constituting the second three-dimensional model, and animation formulating means for formulating an animation from the first and second three-dimensional models obtained from the unit figure matching.

In still another aspect, the present invention provides a data processing method for performing data processing of formulating an animation from first and second three-dimensional models, each defined by an assembly of unit figures. The data processing method includes a unit figure matching step of performing unit figure matching of matching unit figures constituting the first three-dimensional model to unit figures constituting the second three-dimensional model, and an animation formulating step of formulating an animation from the first and second three-dimensional models obtained from the unit figure matching.

In still another aspect, the present invention provides information furnishing medium for furnishing the control information for causing an information processing apparatus to perform data processing of formulating an animation from first and second three-dimensional models, each defined by an assembly of unit figures. The control information includes a unit figure matching step of performing unit figure matching of matching unit figures constituting the first three-dimensional model to unit figures constituting the second three-dimensional model, and an animation formulating step of formulating an animation from the first and second three-dimensional models obtained from the unit figure matching.

In yet another aspect, the present invention provides an information furnishing medium for furnishing the results of data processing of formulating an animation from first and second three-dimensional models, each defined by an assembly of unit figures, wherein the information furnishing medium furnishes animation data obtained on performing unit figure matching of matching unit figures constituting the first three-dimensional model to unit figures constituting the second three-dimensional model, and on formulating an animation from the first and second three-dimensional models obtained from the unit figure matching.

In an embodiment of the data processing method and apparatus and the information furnishing medium according to the present invention, each of the first and second three-dimensional models is split into corresponding parts, and unit figures making up a part of the first three-dimensional model are matched to the unit figures. Thus, it becomes possible to realize spontaneous morphing in which a pre-set portion of, for example, the first three-dimensional model is deformed into the desired portion of a second three-dimensional model.

In another embodiment of the data processing method and apparatus and the information furnishing medium according to the present invention, there are provided the results of reconstruction of the first and second three-dimensional models obtained on splitting each of the first and second three-dimensional models into corresponding parts, matching unit figures constituting the part of the first three-dimensional model to those constituting the part of the second three-dimensional model and on reconstructing the parts obtained from the unit figure matching into the first and second three-dimensional models. Thus, it becomes possible to prepare a keyframe animation using the results of reconstruction of the three-dimensional models.

In still another embodiment of the data processing method and apparatus and the information furnishing medium according to the present invention, the unit figures making up the first three-dimensional model are matched to those making up the second three-dimensional model to prepare an animation from the first and second three-dimensional models. Thus, it becomes possible to prepare an animation which may be processed with desired morphing.

In yet another embodiment of the information furnishing medium according to the present invention, the unit figures making up the first three-dimensional model are matched to those making up the second three-dimensional model, and an animation is prepared from the first and second three-dimensional models from the unit figure matching process to furnish animation data. Thus, it becomes possible to furnish an animation which may be processed with desired morphing.

DESCRIPTION OF THE PREFERRED EMBODIMENTS

Figure 1:
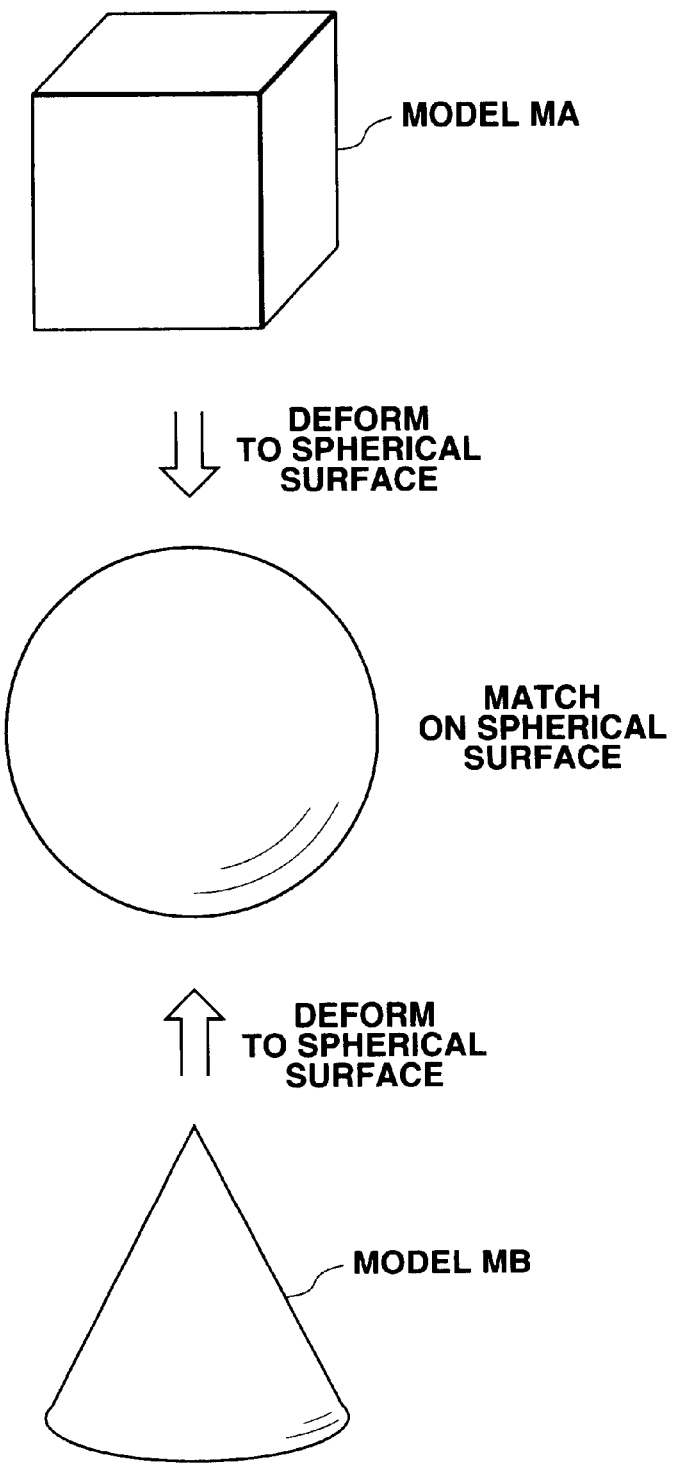
FIG. 1 illustrates a conventional method used for model matching.
Figure 2:
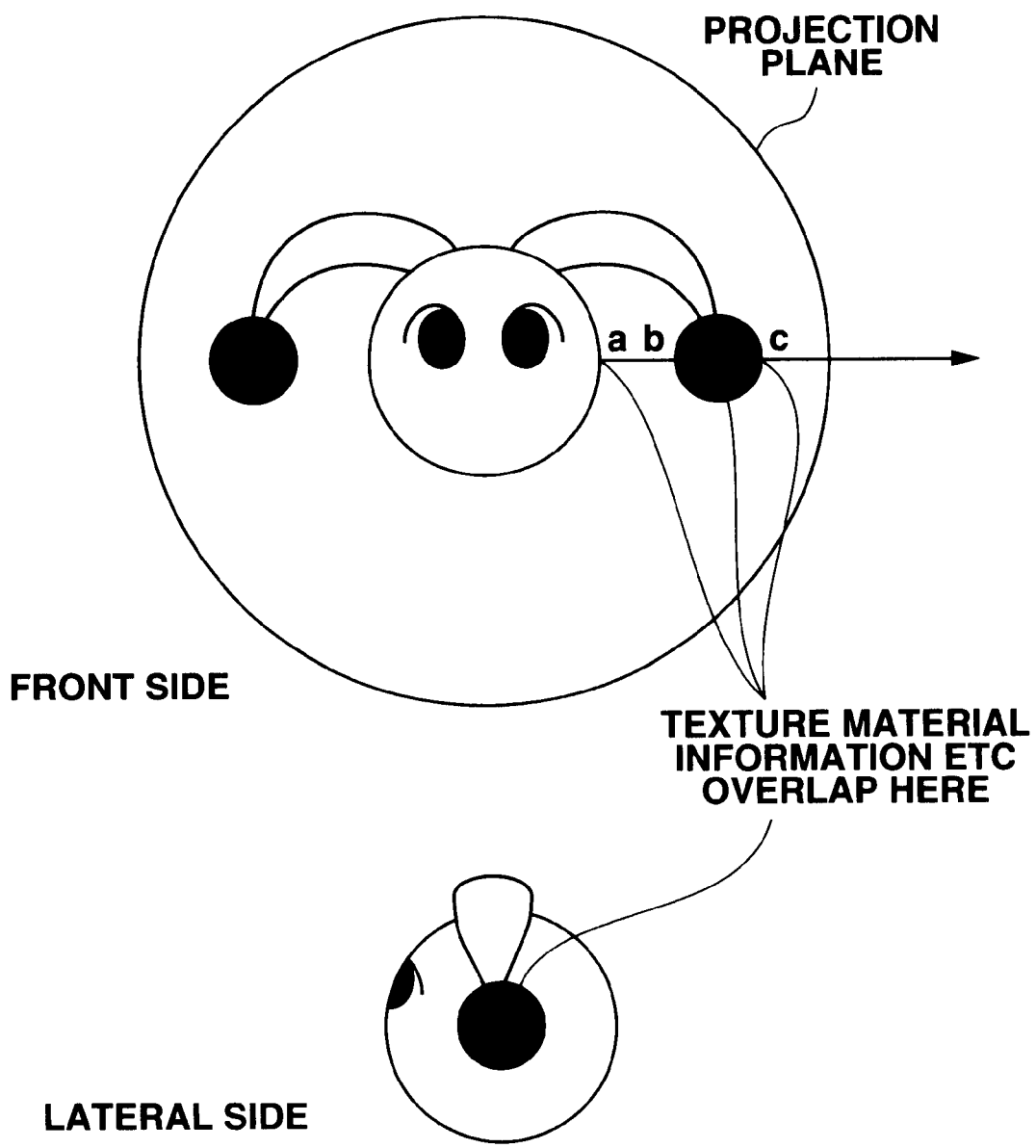
FIG. 2 shows the state of model projection on a spherical surface.

Referring to the drawings, preferred embodiments of the present invention will be explained in detail.

Figure 3:
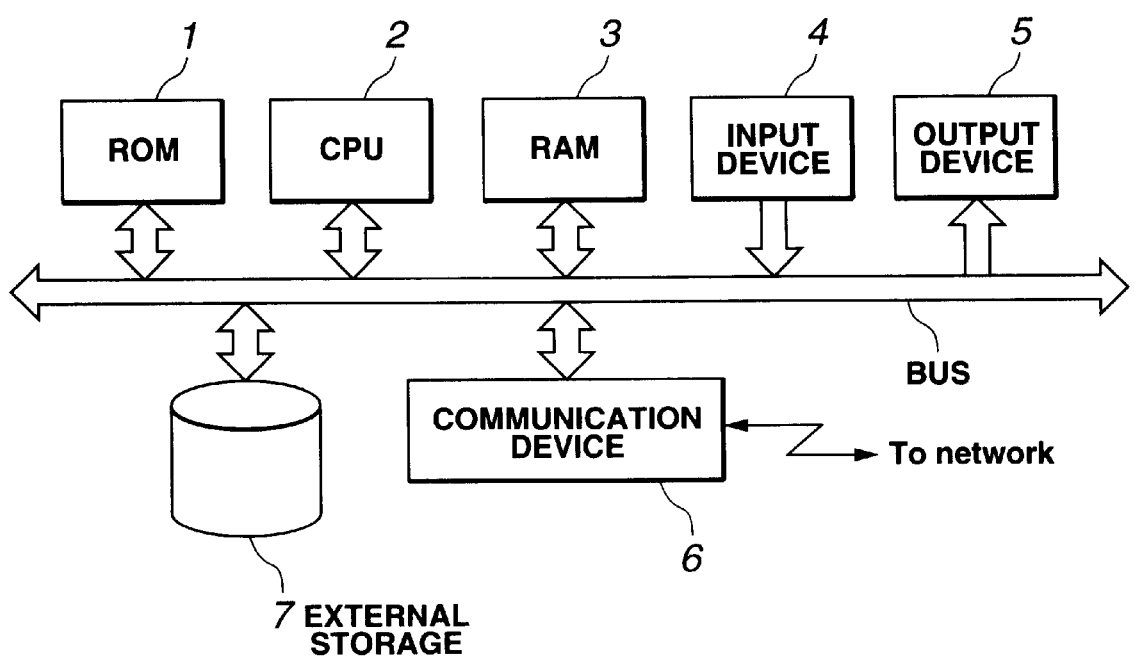
FIG. 3 is a block diagram showing an illustrative structure of an embodiment of a computer graphics system embodying the present invention.

FIG. 3 shows an illustrative structure of an embodiment of a computer graphics system embodying the present invention. The "system" herein means a logical assembly of plural devices in which it does not matter whether or not the respective devices are in the same casing.

A read-only memory (ROM) 1 stores a program for e.g., initial program loading (IPL). A central processing unit (CPU) 2 reads out and executes the program of an operating system (OS) stored in, for example, an external storage device 7, and executes the an application program stored in the external storage device 7 to carry out variable processing which will be explained subsequently. A random-access memory (RAM) 3 temporarily stores the program executed by the CPU 2 or data necessary for processing by the CPU 2.

An input device 4 is comprised of a keyboard or a mouse and is actuated when necessary commands or data are inputted to the CPU 2. An output device 5 is constituted by, for example, a cathode ray tube (CRT) or a liquid crystal display and is configured for demonstrating the necessary information under control by the CPU 2. A communication device 6 is made up of a modem, terminal adapter (TA) and a network adapter and is configured for controlling the communication with outside.

The external storage device 7 is made up of, for example, a hard disc (HD) or a compact disc (CD) and has the OS program or variable application programs stored therein. The external storage device 7 also is adapted to store data to be processed by the CPU 2 or the as-processed data.

Meanwhile, the blocks constituting the above-described computer graphics system are interconnected over a bus.

In the above-described computer graphics system, polygons constituting two three-dimensional models, defined by a set of polygons, sometimes referred to below as polygonal models, are matched to one another by way of performing morphed animation for formulating a spontaneous morphed animation.

Figure 4:
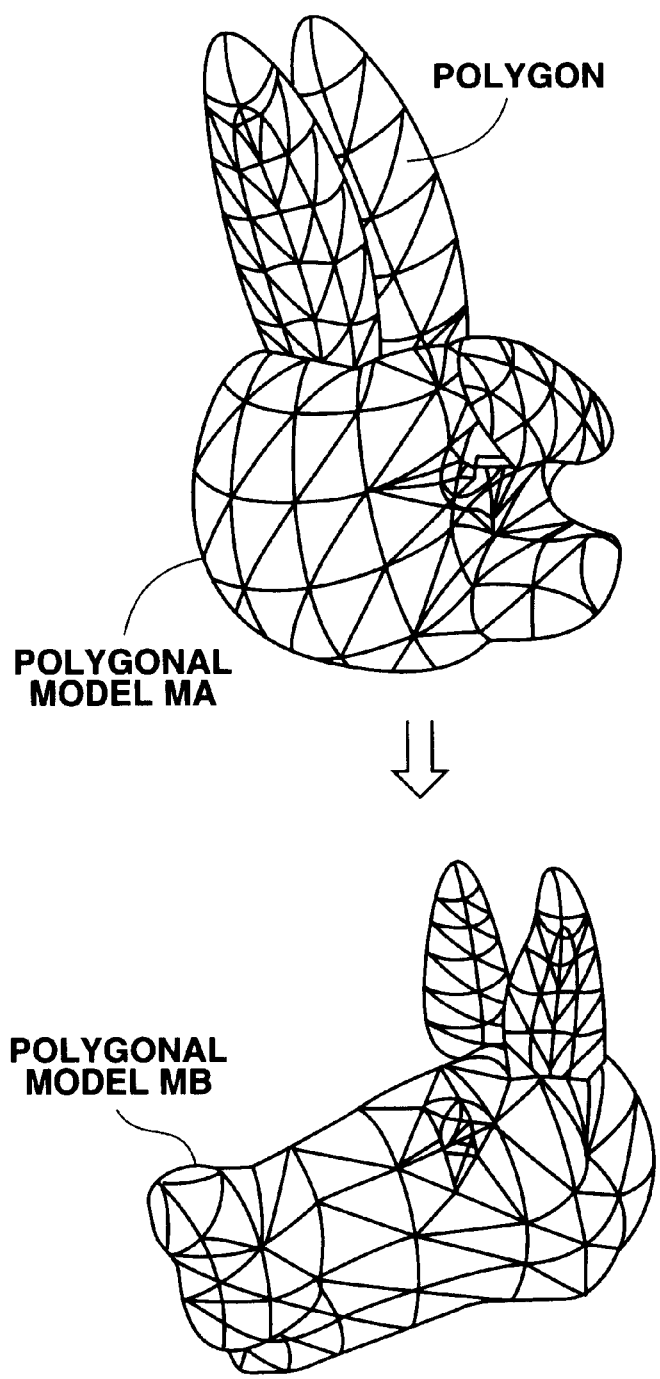
FIG. 4 shows polygonal models for a rabbit and a horse.

Suppose that a polygonal model in the shape of a rabbit, and another polygonal model in the shape of a horse, as shown in FIG. 4, are stored in the external storage device 7. The CPU 2 matches the polygons constituting the polygonal model MA and the polygonal model B to one another to formulate a morphed animation by gradually deforming the polygon model MA of the rabbit to the polygonal model MB of the horse. After matching the polygons making up the polygonal model MA and the polygonal model B, the CPU 2 interpolates a polygon, the shape of which is changed from the polygon of the polygon model MA to the polygon of the polygonal model MB, in a frame between a frame of the polygon model MA and a frame of the polygonal model MB to formulate a morphed animation.

Figure 6:
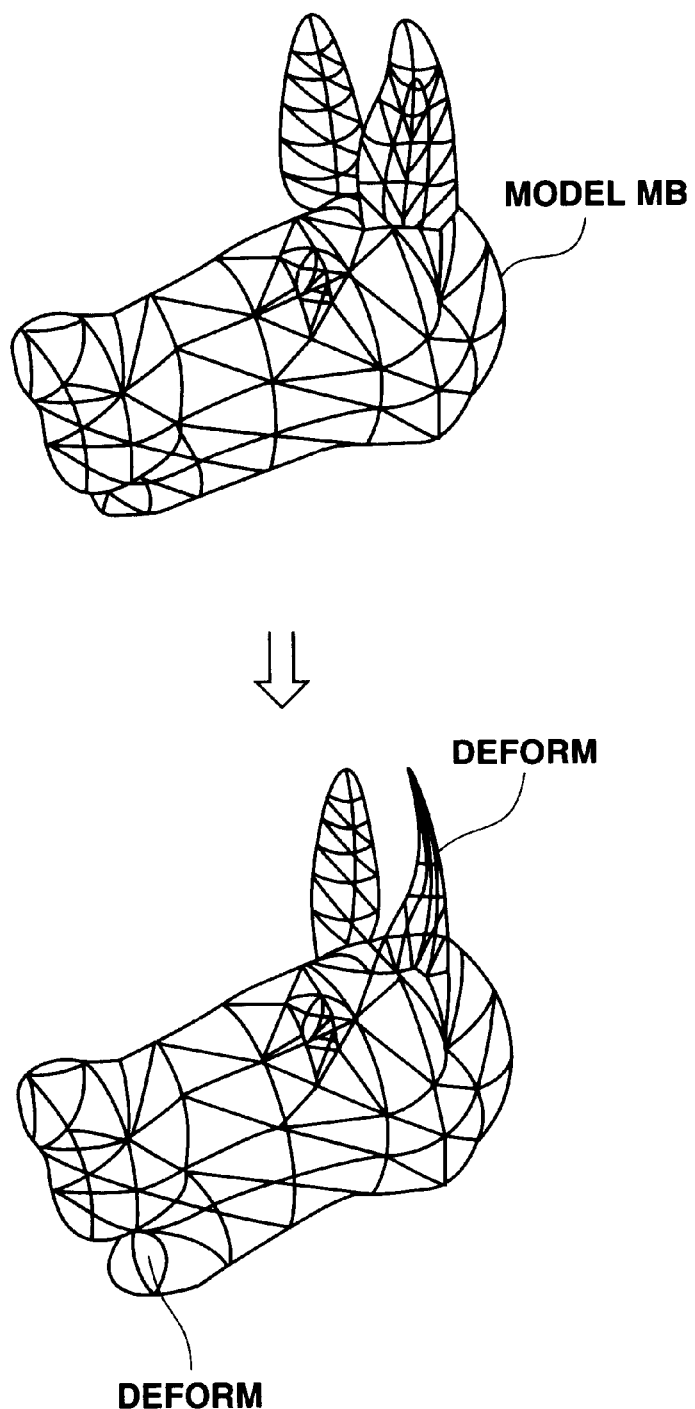
FIG. 6 shows an animation of a horse having a chat.

The CPU 2 also is configured for forming a keyframe animation using the formulated morphed animation. That is, the CPU 2 is configured to morph from the polygon model MA of a rabbit shown in FIG. 4 to the polygonal model MB of the horse and to formulate a keyframe animation in which the mouse and the ear of the horse are deformed, as shown for example in FIG. 6, using the polygonal model MB of the horse resulting from the morphing as a keyframe.

The animation data, formulated in the CPU 2, is sent to and displayed on an output device 5. Alternatively, the animation data is sent to and stored in the external storage device 7, so that it will be used as a keyframe in an authoring tool for animation. Still alternatively, the animation data is routed to an external device via a communication device 6.

Meanwhile, the polygon models MA and MB can also be formulated by exploiting the pre-existing modelling software, such as, for example, LIGHTWAVE3D or SOFTIMAGE|3D (both being trademarks).

Figure 7:
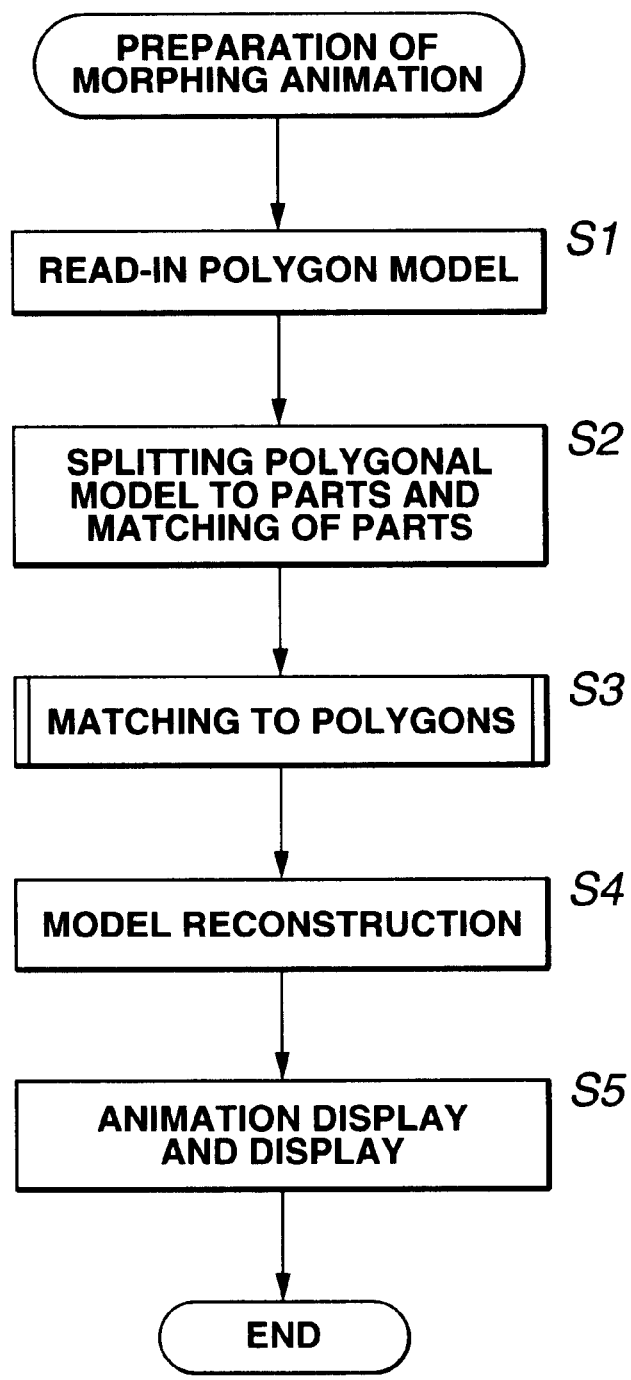
FIG. 7 is a flowchart for illustrating the processing for preparing a morphed animation.

Referring to the flowchart of FIG. 7, the processing of preparing a morphed animation by executing the application program stored in the external storage device 7 is explained. It is assumed that the polygon model MA in the shape of a rabbit and the polygonal model MB in the shape of a horse, shown in FIG. 4, which are the polygonal models to be morphed as described above, are stored in the external storage device 7.

In the processing for formulating the morphed animation, the polygon model MA and the polygonal model MB, to be morphed, stored in the external storage device 7, are read out and developed on the RAM 3 at step S1. The CPU 2 then advances to step S2 to split the polygon model MA and the polygonal model MB into associated parts.

Figure 8:
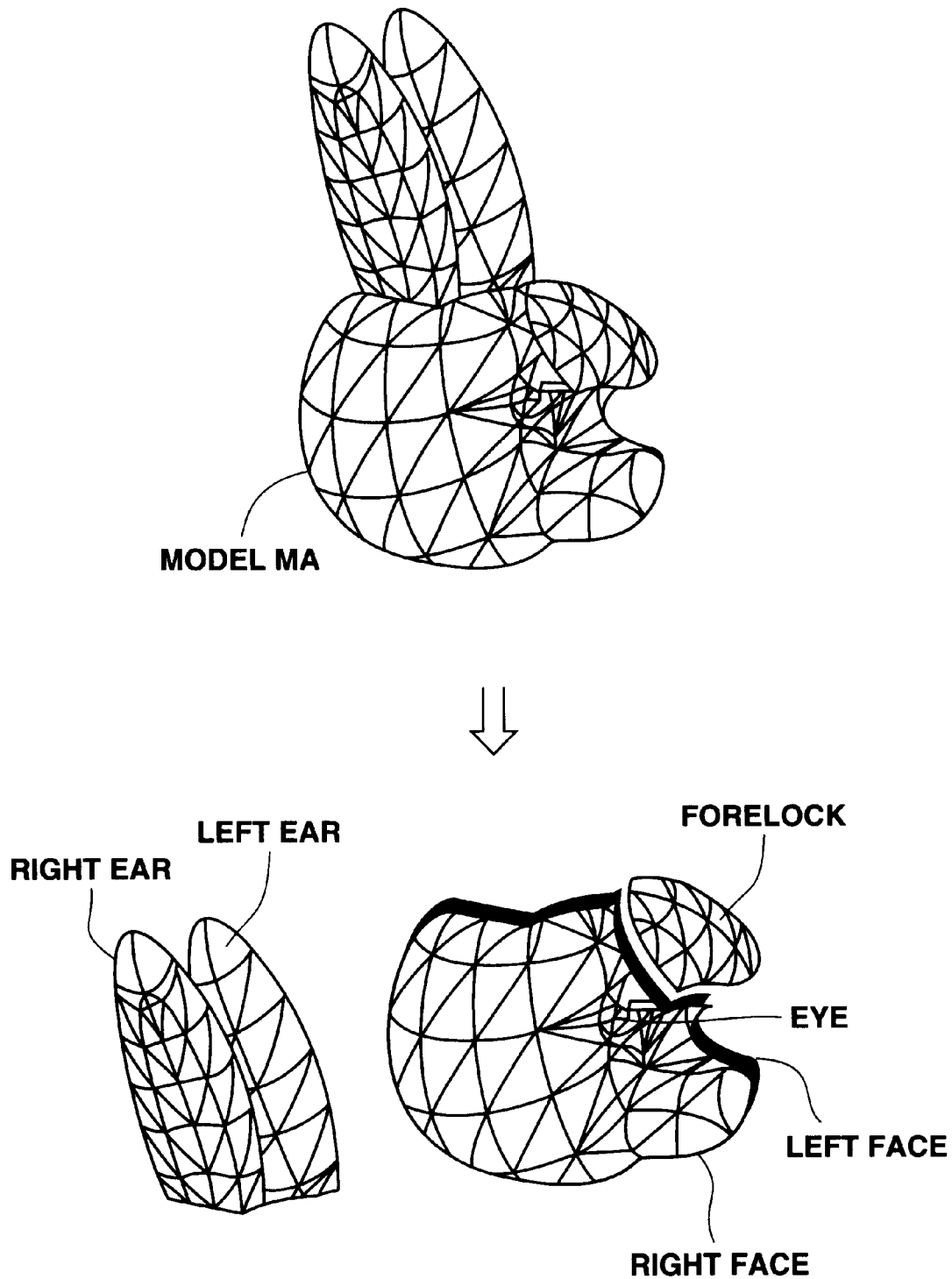
FIG. 8 shows a polygonal model split into plural parts.

That is, the CPU 2 demonstrates the polygon model MA of the rabbit on the output device 5, as shown in FIG. 8A, to wait for instructions from a graphics designer. If the graphics designer then actuates the input device 4 to instruct splitting the rabbit polygon model MA into plural parts, the CPU 2 follows the instructions to split the rabbit polygon model MA into plural parts, as shown in FIG. 8B. Meanwhile, in the embodiment of FIG. 8, the rabbit polygon model MA is split into six parts, namely a left ear, a right ear, forelock, eye, left part of the face and the right part of the race.

The graphic designer splits the horse polygonal model MB into plural parts in similar manner. It is noted that the horse polygonal model MB needs to be split into the same number of parts as in the rabbit polygon model MA.

When the CPU 2 splits each of the polygon model MA and the polygonal model MB into an equal number of parts, it waits for instructions from the graphics designer. If the graphics designer actuates the input device 4 to instruct the parts of the polygon model MA and the parts of the polygonal model MB to be matched to the parts of the polygon model MA, the CPU 2 matches the parts of the polygon model MA with those of the polygonal model MB in accordance with the instructions.

It is noted that, in the morphing, the parts of the polygon model MA are deformed into those of the matched polygonal model MB. Thus, if, when the rabbit polygon model MA is split into parts, as explained with reference to FIG. 8, the horse polygonal model MB is also split into similar parts, that is into six parts, namely a left ear, a right ear, forelock, eye, left part of the face and the right part of the race, and the corresponding parts are matched to one another, spontaneous morphing can be achieved. That is, in the present case, the left ear, right ear, forelock, eye, left part and the right part of the race of the rabbit are deformed into the left ear, right ear, forelock, eye, left part and the right part of the race of the horse, respectively.

In the above case, it is up to the instructions by the graphics designer into which parts the polygon model should be split and which parts should be matched to one another. It is however possible to have the information on the parts contained in the polygon model data, to split the polygon model into parts based on the information and to match the corresponding parts to one another.

Meanwhile, splitting into parts needs to be performed so that the boundary of parts, or the "cutting line" of splitting, will be a continuous sole line.

Figure 9A:
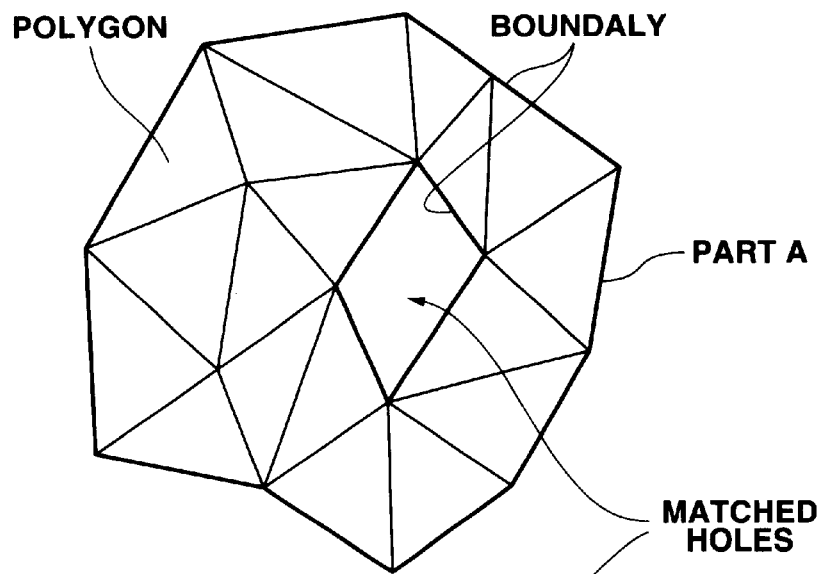
FIGS. 9A, 9B illustrate the method for coping with a case in which parts own holes.

Specifically, a given part A of the polygon model MA and a part B of the polygonal model MB matched thereto may have the boundary delimiting their outer periphery and moreover may be formed with inner holes delimited by the boundary constituting the boundary of the parts A and B, as shown in FIG. 9A. In such case, the boundary delimiting the parts A and B is not continuous to the boundary delimiting the inner holes. If the polygon of the part A and the polygon of the part B are matched to each other without any constraint, there is a risk that the boundary defining the outer rim of the part A be non-spontaneously matched to the boundary of the inner hole of the part B. Therefore, the splitting into parts is desirably so made that the boundary of the parts will be a non-interrupted line.

If the eye is split as a part from the polygon model, as shown in FIG. 8B, the eye represents an internal hole with respect to the remaining portions, resulting from splitting, such that splitting cannot be made so that the boundary of the parts will present a continuous line. In such case, it is possible to have the registering holes specified by the graphics designer and to have the holes matched to each other to prevent non-spontaneous association.

Figure 10A:
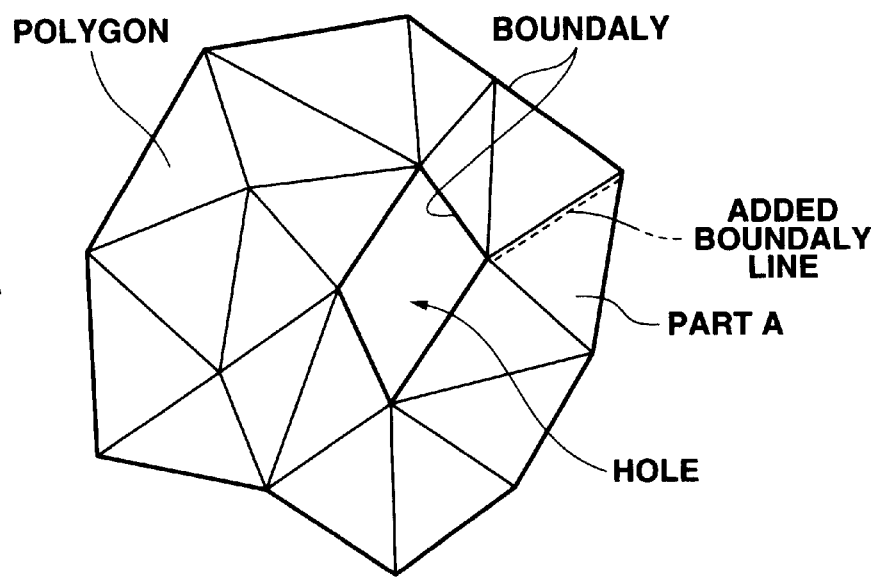
FIGS. 10A, 10B similarly illustrate the method for coping with a case in which parts own holes.

As for the parts presenting holes, it is possible to add the boundary along ridge lines of a polygon, as indicated by a broken line in FIG. 10A, to provide a continuous boundary line.

Figure 10B:
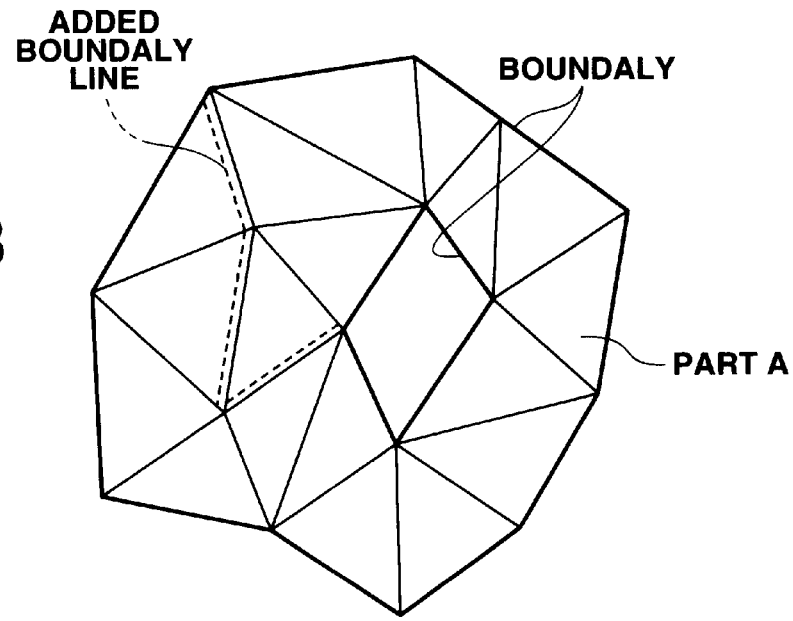

Meanwhile, the boundary can be added along ridge lines of the polygons along a ridge line of a sole polygon, as shown in FIG. 10A, or along the ridge lines of plural polygons, as shown in FIG. 10B.

Figure 9B:
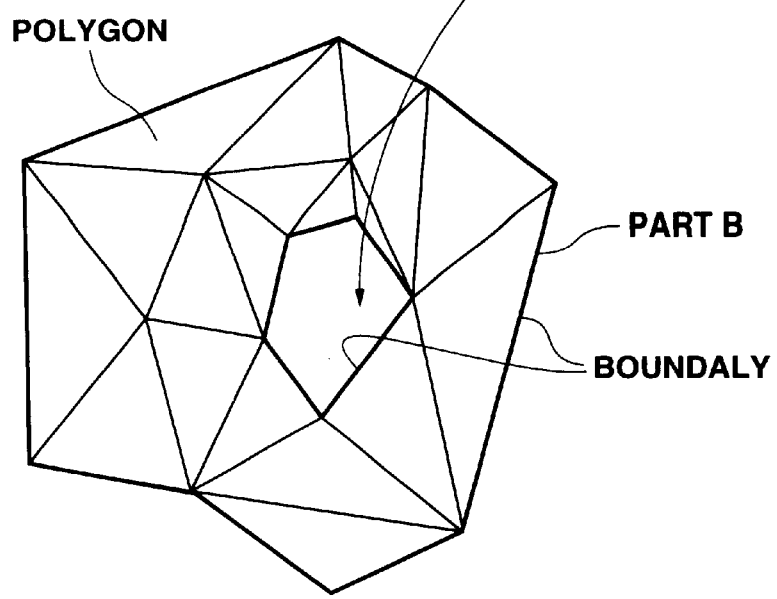

The boundary may be added along optional ridge lines of a polygon. However, the result of matching between the polygons may differ depending on how the boundary is added to each of the parts A and B, as shown for example in FIG. 9. Thus, if it is more desirable to have desired portions matched to each other, it is more preferred to have corresponding instructions issued by the graphics designer.

Figure 5:
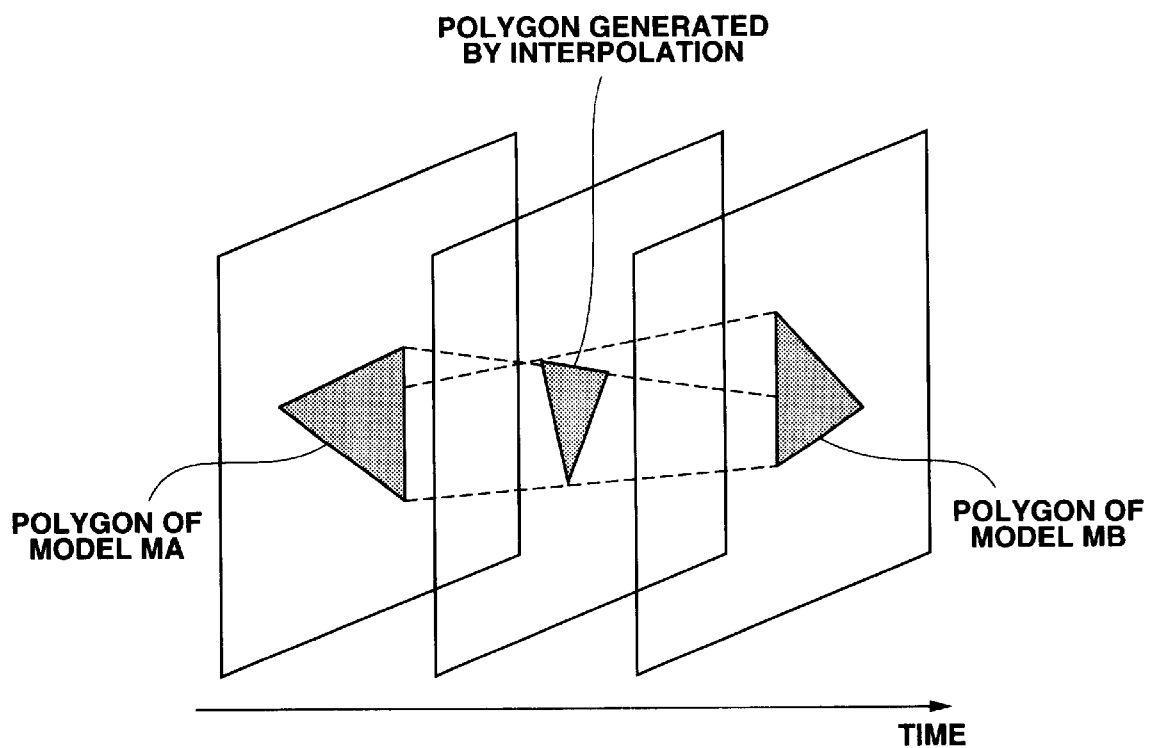
FIG. 5 shows the method for preparing the morphed animation.

Reverting to FIG. 7, if the polygon model MA and the polygonal model MB are split into plural parts, and the associated parts are matched to one another, the CPU 2 moves to step S3 and, from one matched part pair to another, the polygons constituting the respective parts are matched to one another. If the polygons of the matched part pairs are matched to one another, the polygon models MA and MB are reconstructed at step S4, using the matched parts. The CPU 2 then advances to step S5. At this step S5, the morphed animation is prepared, using the polygon model MA and the polygonal model MB, reconstructed at step S4, as the keyframe, as explained in FIG. 5. At step S5, the morphed animation is routed to and displayed in the output device 5 to complete the morphed animation preparing sequence of operations.

In FIG. 7, the morphed animation is formulated, using the reconstructed polygon models MA and MB as the keyframes. Alternatively, data of the polygon models MA and MB can also be furnished via the communication device 6 to other devices or stored in the external storage device 7 so as to be used as a keyframe for preparing the keyframe animation used in e.g., a game.

The polygon matching for each of the matched parts at step S3 in FIG. 7, sometimes referred to below as the polygon matching or polygon matching processing, is hereinafter explained.

Figure 11:
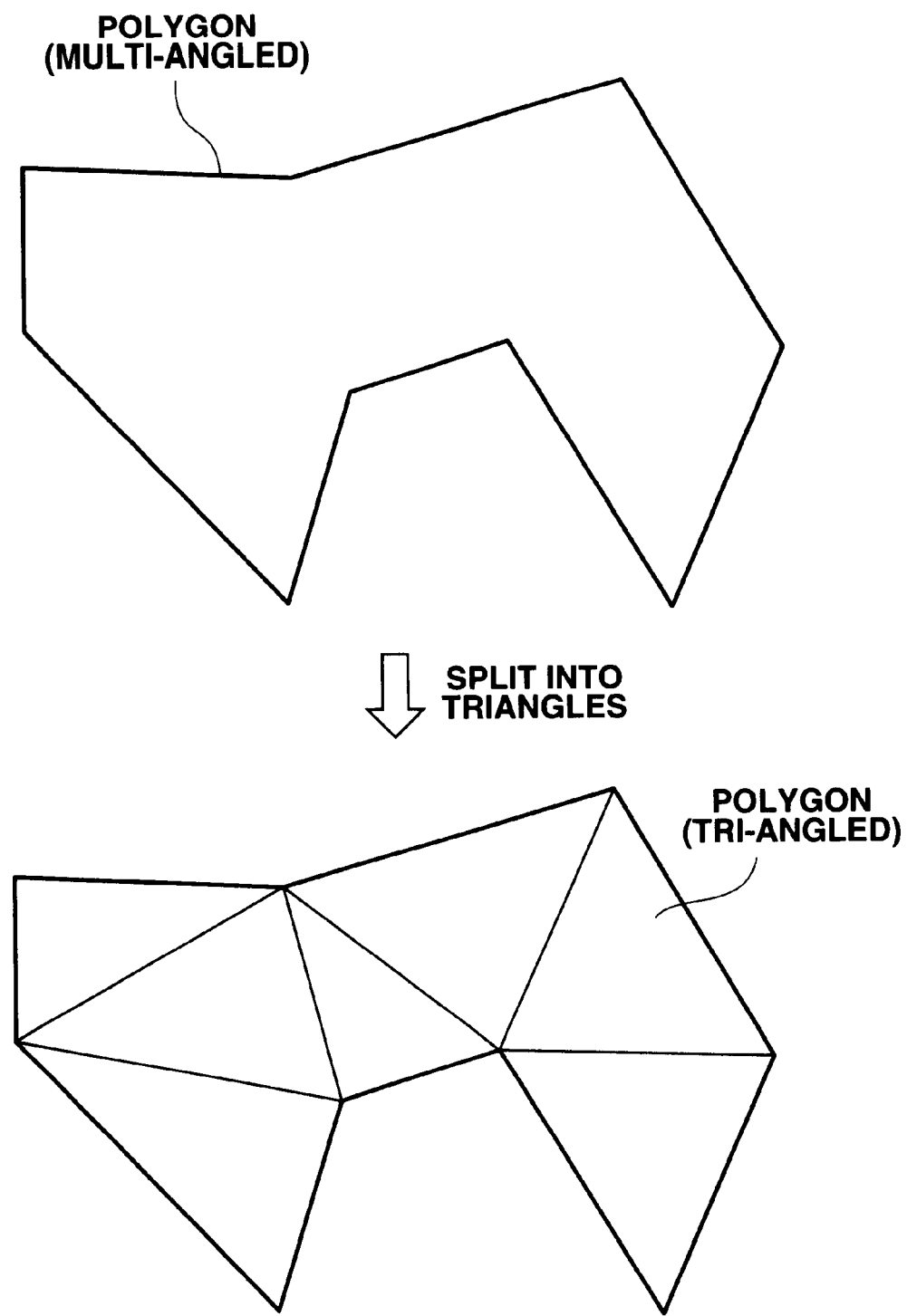
FIG. 11 shows the manner of splitting a polygon into triangles.

In the polygon matching, a polygon constituting a part is initially split into plural triangular polygons, as shown in FIG. 11. That is, if the polygon constituting a part being processed by the polygon matching is a polygon other than a triangle, the polygon is split into triangular polygons.

As for the parts to be processed by polygon matching, the relation of connection of apiece of the polygons constituting the part is rendered into a graph. That is, as the relation between the apiece of the constituent polygons (topology) is maintained, the parts are projected on a pre-set plane and rendered into a graph or plane graph.

Figure 12:
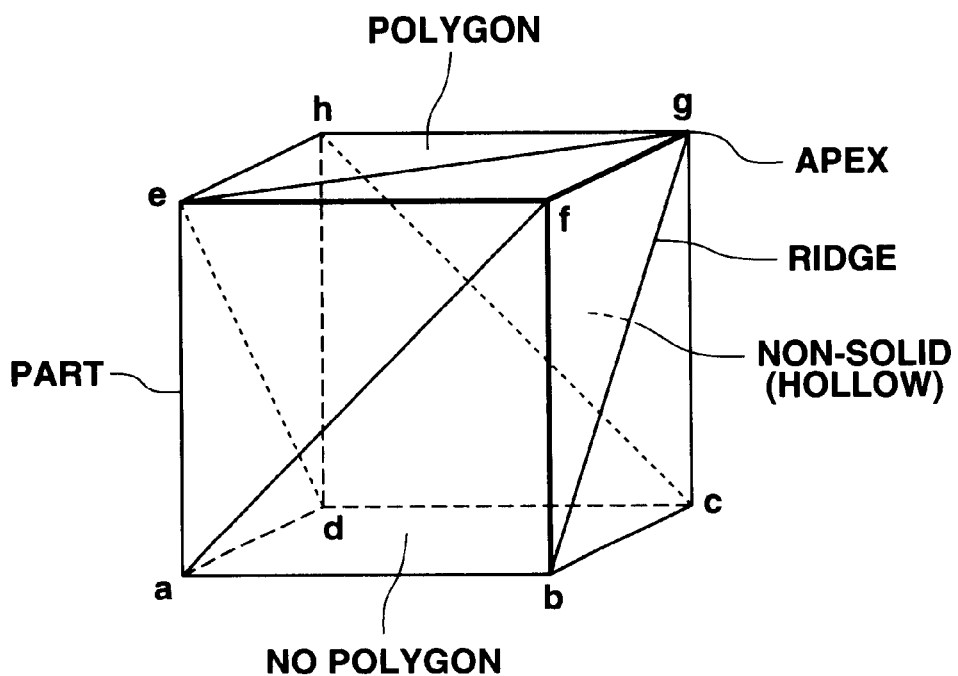
FIG. 12 illustrates rendering to a plane graph.
Figure 12:
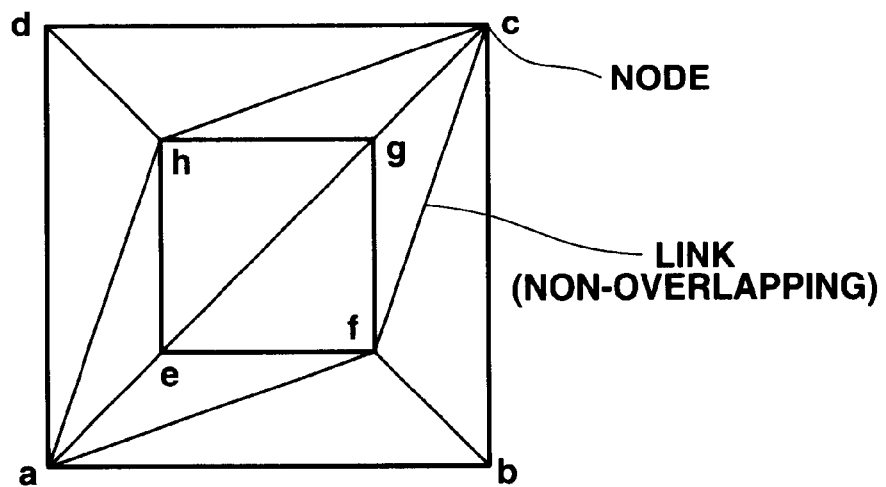

If specifically the part to be subjected to polygon matching is a cube devoid of a bottom abcd, as shown in FIG. 12A, that is if the part is a part split from the polygonal model split, along lines ab, bc, cd, da, as the slicing lines (boundary), and if the part is presupposed to be formed of an elastic material, such as rubber, the part of FIG. 12A is rendered into a plane graph shown in FIG. 12B by enlarging the hole of the bottom abcd and the part is collapsed onto a flat surface without gap. The graph obtained on rendering into a plane graph, and which represents the relation between the apex points and the ridge lines of the polygons constituting a part, is sometimes termed a plane graph (apex connection relational graph).

Here, the part is projected on the flat surface to render the relation between the apiece and the ridge lines of the polygons constituting it into a graph. Alternatively, this graph can also be prepared by projecting the part on a spherical or the like curved surface.

With the plane graph, described above, the apiece and the ridge lines of the polygon are expressed by a node (point) and by a link (line segment), respectively, as can be understood from comparison of FIGS. 12A and 12B.

Meanwhile, intersection between links is not allowed in the plane graph.

After formulating the plane graph, a connection relational graph (unit figure connection relational graph), which renders the relation of connection among polygons constituting the part into a graph, is formulated, based on the plane graph.

Figure 13A:
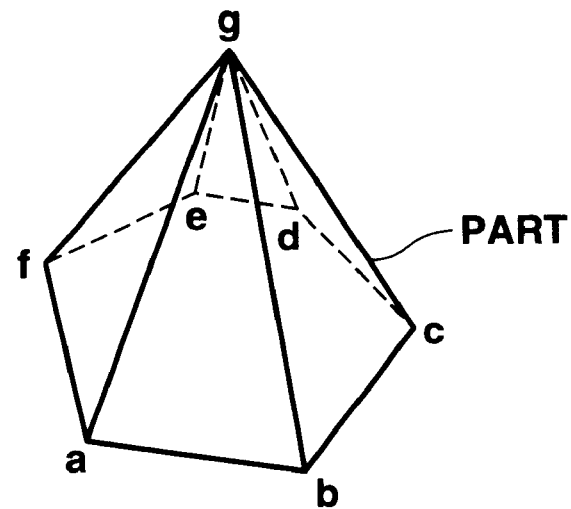
FIGS. 13A, 13B similarly illustrate rendering to a plane graph.
Figure 13B:
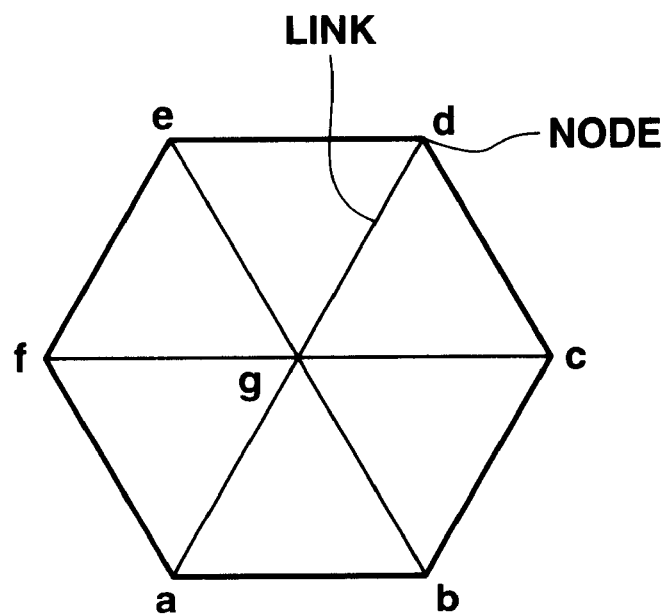

That is, if the part to be subjected to polygon matching, is of a shape of a hexagonal pyramid, devoid of the bottom abcdef, as shown in FIG. 13A, a plane graph shown in FIG. 13B is formulated, as may be seen from above.

Figure 14A:
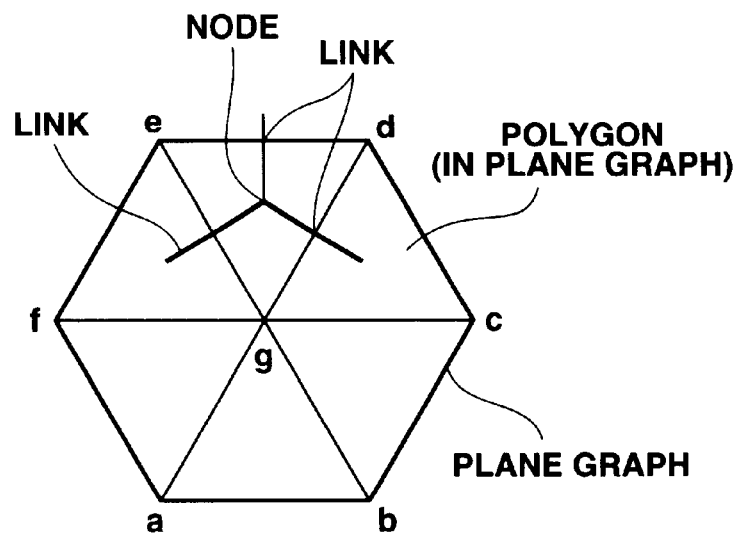
FIGS. 14A, 14B illustrate a connection relational graph.

In this case, a certain polygon edg in the plane graph is taken into consideration. From this polygon edg, a link is formed to each of three polygons, namely polygons cdg and efg connecting to the polygon edg and a polygon neighboring to a side ed of the polygon edg (here, a polygon constituting the other part), as shown in FIG. 14A. Since the polygon constituting a part is necessarily a triangular polygon, each polygon necessarily connects to three polygons in the plane graph, so that a link formed for each polygon is necessarily tri-furcated, as shown in FIG. 14A.

Figure 14B:
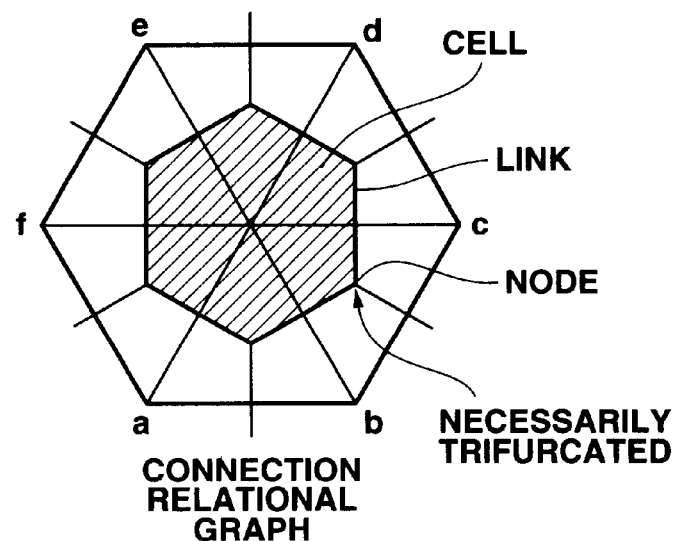

Since the links are formed in similar manner for other polygons of the plane graph, a connection relational graph, shown in FIG. 14B, is formulated from the other plane graph of FIG. 13B.

With the above-described connection relational graph, the polygon is represented by a node, such that connection between neighboring nodes is represented by the link. In FIG. 14B, a shaded area surrounded by a link is termed a cell. The cell represents the apex points of the polygon.

For clarifying that matching between polygons can be realized based on the connection relational graph, a plane graph is formulated for convenience. That is, since the relation between the apex point and the ridge line can directly be recognized from the polygonal model, the connection relational graph can be formulated from the polygonal model without the necessity of actually preparing the plane graph.

After formulating the connection relational graph, the polygons making up matched parts are matched based on the connection relational graph.

For matching the polygons of the matched parts, the numbers of the polygons making up the matched parts need to be equal to each other. In a majority of cases, the polygons are not matched. If the numbers of the polygons are not coincident, polygons are added to one or both of the matched parts to bring the numbers of the polygons of the parts into coincidence with each other. It is noted that, if polygons are deleted to bring the numbers into coincidence, the shape of the parts from which the polygons are deleted is changed. Therefore, the polygons cannot be deleted. The polygon addition needs to be performed without changing the shape of the part.

Therefore, the polygon needs to be added by inserting a polygon with a zero area. The polygon with the area 0 can be inserted as shown for example in FIG. 15.

Figure 15A:
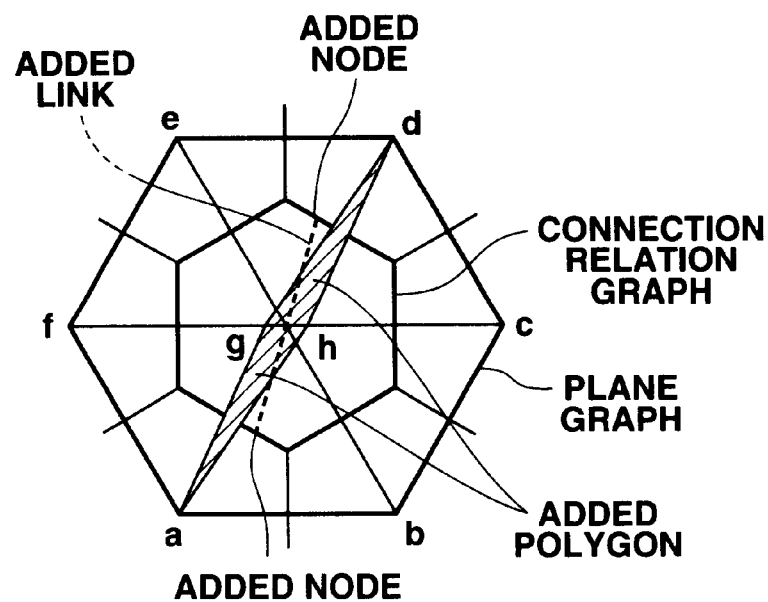
FIGS. 15A, 15B, 15C illustrate polygon addition by adding a link to the connection relational graph.

That is, if the connection relational graph as shown in FIG. 14B has been obtained, a link is added in the inside of the cell in a manner of dividing the cell into two, as shown by a broken line in FIG. 15A. By the division of the cell into two cells, the number of cells is increased by one, so that an apex point corresponding to the increased cell is added. In FIG. 15A, an added apex h is shown.

Moreover, since the added link intersects or connects to the link surrounding the original cell, two nodes are added, so that a polygon matched to the added nodes is added. Specifically, two polygons (triangular polygons) are added, as shown shaded in FIG. 15A. Here, polygons dgh and agh are added in FIG. 15A.

By adding links to the cell, the number of apex points is increased by one, whilst the number of polygons is increased by two. In the plane graph, shown in FIG. 15A along with the connection relational graph, a node corresponding to the added apex point is arranged at a position not overlapping with the other node (node on the plane graph), whilst a link as a ridge line of the added polygon is arranged at a position not overlapping with the other link (link on the plane graph). Thus, the added polygon appears to have an area larger than a certain value (larger than 0). However, the area on the plane graph is meaningless so that it may be presumed that a polygon having a zero area has been inserted into the original part.

Figure 15B:
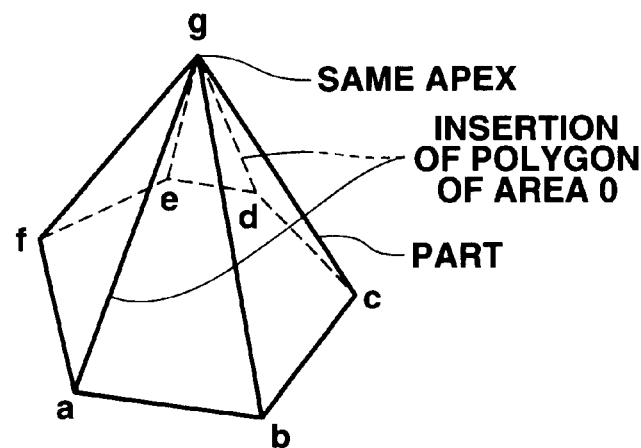
Figure 15C:
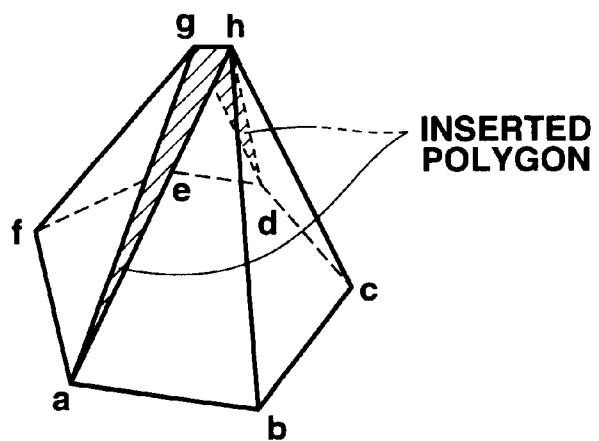

That is, if the link has been added as shown in FIG. 15A, an apex point h is added at the same position as the apex point, whilst polygons dgh and agh, having the apex point as an apex point, are added. In FIG. 15B, the apex h coincides with the apex point g, provided at the outset, the added polygons dgh and agh are of areas equal to 0, so that the part shape after link addition (FIG. 13B) remains unchanged from that before link addition (FIG. 13A). This permits the polygon to be added to the part without changing its shape.

For matching the polygons of the matched parts, the number of the polygons making up the matched part needs to be the same as that of the other matched part. If the numbers are not coincident, it is possible to add polygon(s) to one or both of the matched parts by the above-mentioned technique, without changing the part shape, whereby the numbers of the polygons making up the matched parts can be made coincident with each other.

Meanwhile, the added polygons, with the zero area, are deformed in the course of morphing to the shape of the polygons of the other part, matched to the polygon, so that the added polygons appear as polygons having an area larger than the zero area.

In the polygon matching processing, the polygons of the matched parts are matched, based on the connection relational graph, as described above, as the numbers of the respective polygons of the matched parts are made to be coincident with each other.

Figure 16:
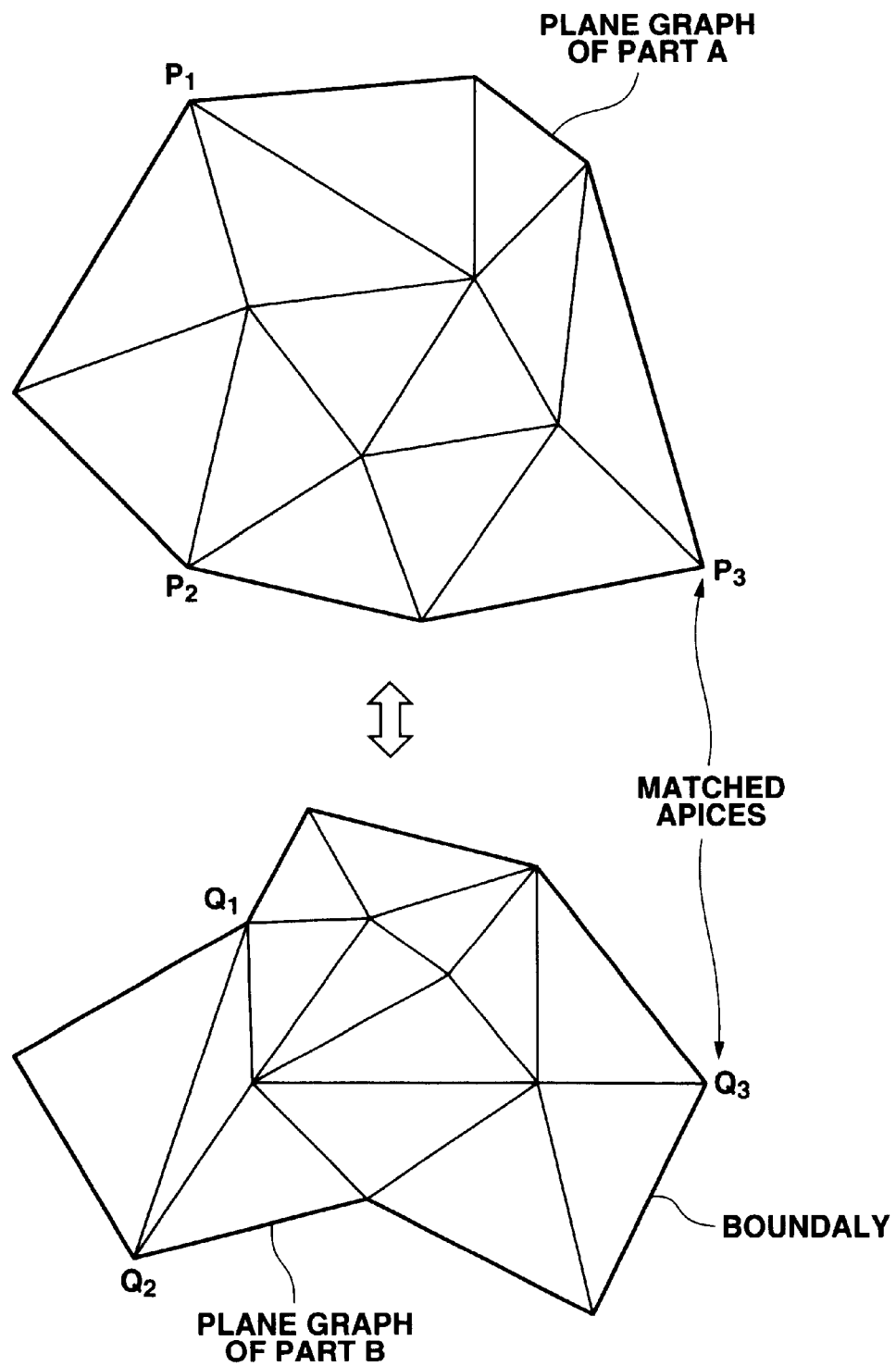
FIG. 16 shows a plane graph.

It is now assumed that polygons of a part A of a polygon model MA is to be matched to those of a part B of the other polygonal model MB, and that a plane graph shown in FIG. 16 has been obtained with each of the part A or B, as shown in FIG. 16.

In this case, apex points desired to be matched to each other, sometimes termed herein the matching apex points, are specified by a graphics designer actuating the input device 4.

Although the matching apex points need not be specified, it is possible to limit the degree of freedom in rotation in matching the respective polygons if the matched polygons are specified. Moreover, if it is desired to deform a certain portion of the part A into a certain portion of the part B, such deformation becomes possible by specifying the apex points of these portions as matching apex points.

Referring to FIG. 16, apex points P1, P2, P3 are specified as matching apex points in the plane graph of the part A, whilst apex points Q1, Q2, Q3 are specified as matching apex points in the plane graph of the part B.

Figure 17:
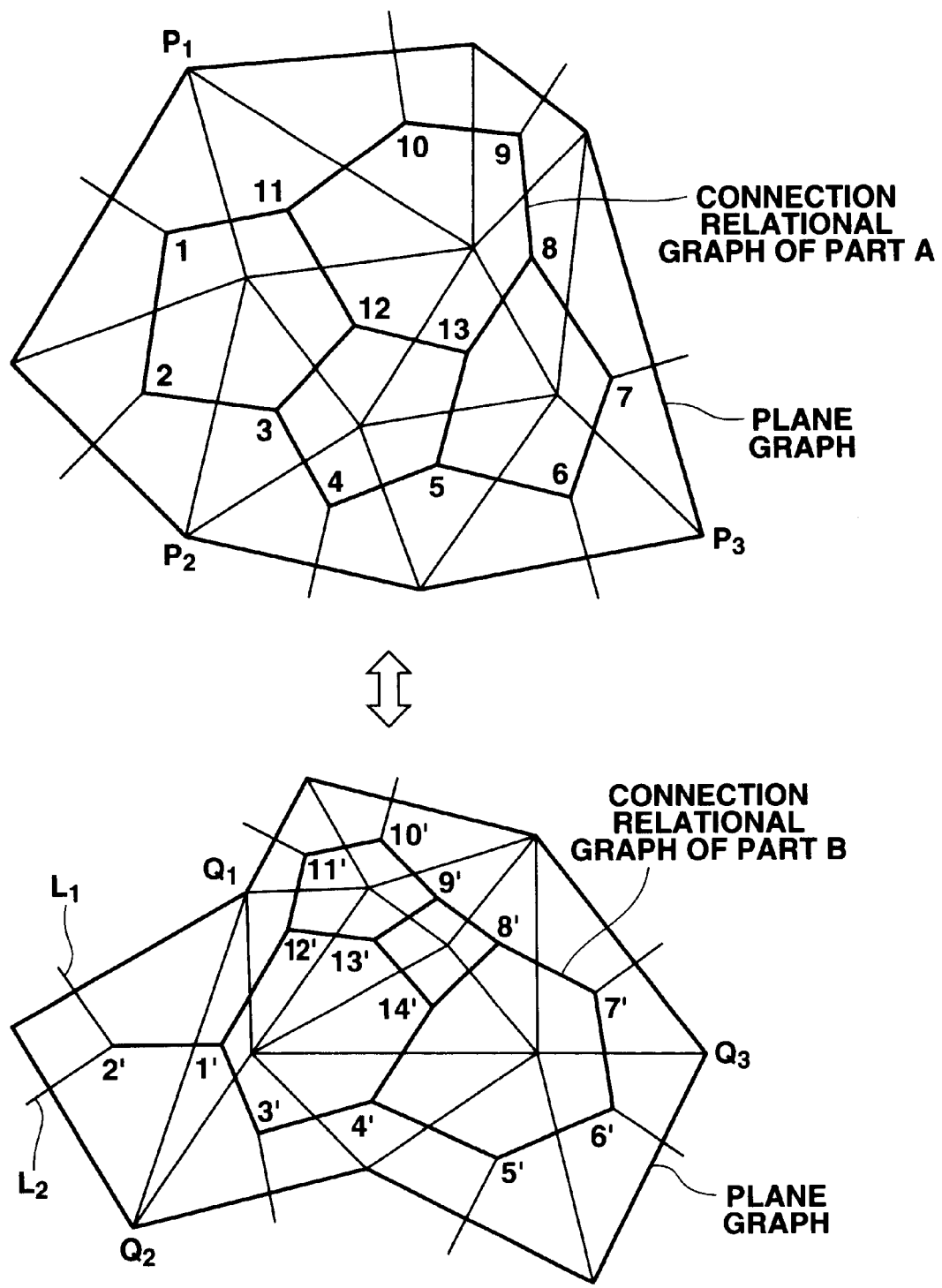
FIG. 17 shows a connection relational graph.

FIG. 17 shows connection relational graphs obtained from the plane graphs of the part A, B. In FIG. 17, respective nodes of the connection relational graphs of the parts A and B are numbered for convenience in making distinction of the nodes of the connection relational graphs of the parts A and B.

Meanwhile, if, in the connection relational graph for the part A, the shortest path is followed along the links through nodes #1 to #11 matched to the respective polygons lying on the outer periphery, there are no links traversed twice or more, that is traversed in redundancy. The trajectory delineated at this time is sometimes referred to below as the outer periphery. However, if, in the connection relational graph for the part B, the shortest path is followed along the links through nodes #1' to #11', there exist links traversed twice or more (links #1', #2'). These links are sometimes referred to below as redundantly traversed links.

If there exist such redundantly traversed links, these links are deleted by adding new links.

That is, if the redundantly traversed links in the connection relational graph of the part B in FIG. 17 are to be deleted, the node #2' not lying on the outer periphery of the connection relational graph is selected from the two nodes #1', #2' as end points of the redundantly traversed links #1', #2'. A link having an end on another link extending from the node #2' to a node corresponding to a polygon constituting another part, sometimes referred to below as a link for deletion, is added.

Figure 18:
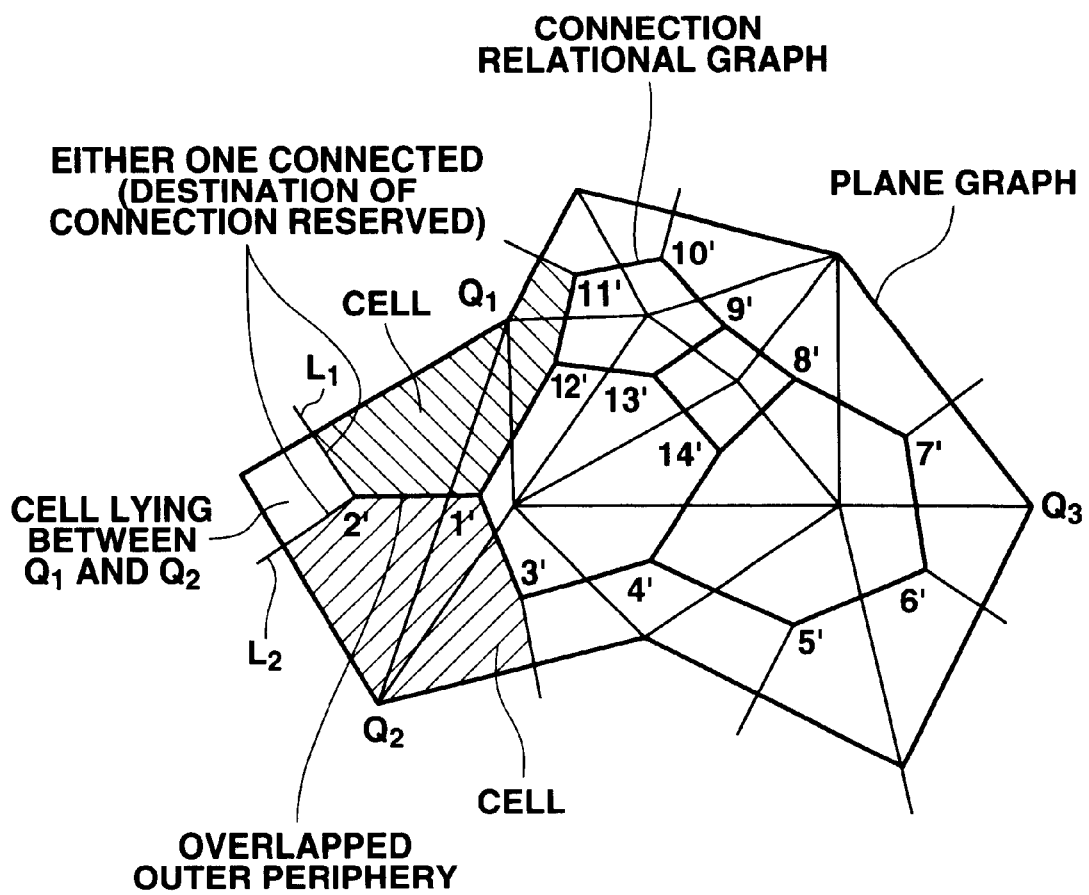
FIG. 18 illustrates deletion of overlapping links.

It should be noted that, in the connection relational graph for the part B, there are two links extending from the node #2' to the node corresponding to a polygon constituting another part, namely links L1 and L2, so that there exist two links for deletion, as shown by broken lines in FIG. 18. For deleting the redundantly traversed links #1', #2', it is only sufficient if one of two links for deletion, indicated by broken lines 18 in FIG. 18, is added. It is noted that deletion of the redundantly traversed link does not mean deletion of the redundant link itself but means setting the redundant link to a non-redundant state and that, by adding one of the two links for deletion, there is no redundant link present on the outer periphery of the connection relational graph. Although the problem is raised as to which of the links for deletion is to be added for deleting the redundantly traversed links #1', #2', the solution to the problem is here reserved. The links reserved as to addition, here the two links for deletion, are sometimes referred to below as reserved links.

Referring to FIGS. 16 and 17, the apex points P1, P2 and P3 are specified as matching apex points, in the plane graph of the part A, whilst the apex points Q1, Q2 and Q3 are specified as matching apex points to be matched to the apex points P1, P2 and P3, in the plane graph of the part B. If the matching apex points have been specified in this manner, cells matched to the matching apex points are first matched.

Specifically, with the connection relational graph of the part A as the reference, the shortest path along the links is followed through the nodes #1 to #11 on the outer periphery, beginning at one of the nodes. Such a link which constitutes the outer periphery of a cell corresponding to the matching apex points is detected and matched to a corresponding cell in the connection relational graph of the part B.

Figure 19:
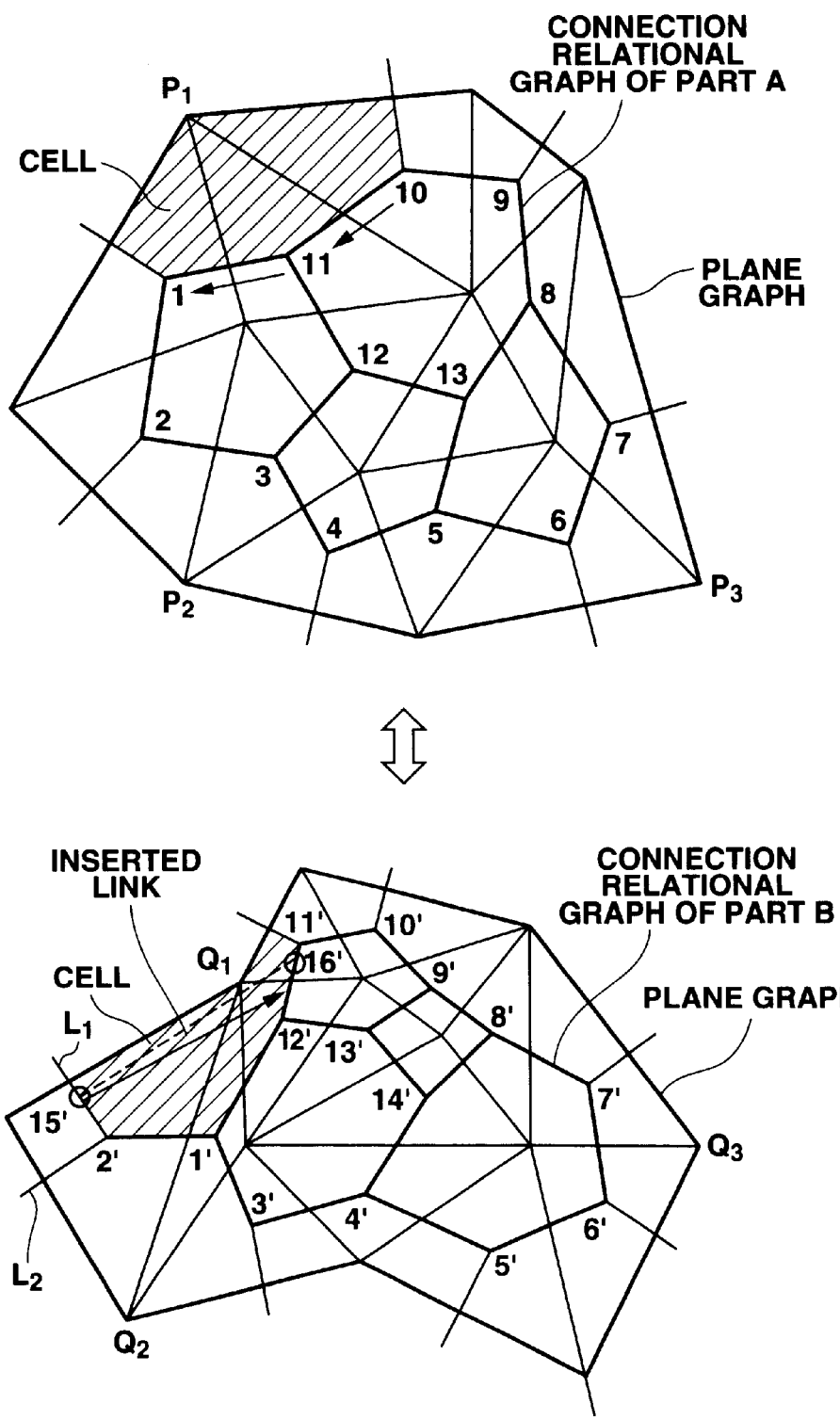
FIG. 19 similarly illustrates deletion of overlapping links.

Specifically, if the nodes on the outer periphery of the connection relational graph of the part A, are followed counterclockwise along the links, beginning at, for example, the node #10, the links #10#11 and #11#1, interconnecting the nodes #10, #11 and #1, are traversed, as shown in FIG. 19. These links #10#11 and #11#1 constitute the outer periphery of the cell corresponding to the matching apex point P1. Therefore, in this case, the cell corresponding to the matching apex point P1 is matched to the cell of the connection relational graph of the part B corresponding to the first-stated cell.

That is, in the present case, the matching apex point in the part B, specified as being the apex point to be matched to the matching apex point P1 of the part A, is the apex point Q1. Thus, the cell corresponding to the matching apex point P1 is matched to the cell corresponding to the matching apex point Q1.

The matching of the two cells is achieved by adding links in the cells to be matched so that the numbers of links connecting to the respective cells, that is the links extending outwardly of the cells from the nodes representing the apiece of the cells, sometimes referred to below as connecting links, will be equal to each other. Meanwhile, the number of the connecting links of a cell is equal to that of the nodes of the cell.

In the connection relational graph of the part A shown in FIG. 19, the links extending outwardly of the cell corresponding to the matching apex point P1, from the nodes #10, #11, #1 representing the apex points of the cell, that is the connecting links, are three links #10#9, #11#12 and #1 #2. Also, in the connection relational graph of the part B shown FIG. 17, the links extending outwardly of the cell corresponding to the matching apex point Q1, from the nodes #11', #12', #1', #2' representing the apex points of the cell, that is the connecting links, are four links #11#10', #12'#13', #1'#3' and L2.

Since the numbers of the connecting links differ in this manner, links are added to the inside of the cell so that these numbers will be equal to each other.

Meanwhile, the links #1' and #2', constituting the outer periphery of the cell corresponding to the matching apex point Q1 to be matched, represent the redundantly traversed links, as discussed above. Which of the two links for deletion L1 or L2 is to be added to delete the redundantly traversed links #1' and #2' is reserved, as shown in FIG. 18.

If the links constituting the outer periphery of the cell to be matched represent the redundantly traversed links, and the addition of the links for deletion used for deleting the redundantly traversed links is reserved, as described above, the links for deletion are added, taking into account another cell having the redundantly traversed links on its outer periphery.

That is, the redundantly traversed links #1' and #2' constitute not only the outer periphery of the cell corresponding to the matching apex point Q1 to be cell-matched but also the outer periphery of the cell corresponding to the matching apex point Q2. Therefore, this cell is taken into account in adding the link for deletion.

Specifically, the cell corresponding to the matching apex point Q2 is the cell lying on the counterclockwise shifted side of the cell corresponding to the matching apex point P1, with a cell having the links L1 and L2 on its outer periphery in-between.

Therefore, the cell in the connection relational graph of the part A, to be matched to the cell corresponding to the matching apex point Q2, is a cell lying on the counterclockwise shifted side of the cell corresponding to the matching apex point P1, with a cell in-between, specifically the cell corresponding to the matching apex point P2 in the connection relational graph of the part A in FIG. 19.

If the numbers of the connection links of the cell having the matching apex point P1 and the cell having the matching apex point Q2 are compared to each other, the connecting links of the cell having the matching apex point P2 are three links, namely the links #2#1, #3#12 and #4#5, whilst the connecting links of the cell having the matching apex point Q2 are three links, namely the links L1, #1'#12' and #3'#4', so that the numbers of the connecting links of the two are equal to each other. Thus, the cell associated with the matching apex point P2 and the cell associated with the matching apex point Q2 can be matched to each other without adding the links.

The result is that if, of the two links for deletion, reserved as shown in FIG. 18, that extended from the link L2 is added, the link is added in the cell associated with the matching apex point Q2, so that, for matching the cells associated with the matching apex points P2 or Q2, which it has been possible to match directly, it becomes necessary to add a link further.

On the other hand, the numbers of the connecting links, matched to the matching apex points P1 or Q1, are not equal to each other, as described above, so that it is necessary to add the links to one or both of the cells so that these numbers will be equal to each other. Thus, the link for deletion extended from the link L1 (reserved in FIG. 18) is added in the cell associated with the matching apex point Q1, as shown by a broken line in FIG. 19.

That is, in the connection relational graph of the part B, there are added links #15', #16' so that these links have one ends at the point #15' on the link L1 while having the other ends at points 16' on the link #11'#12', respectively. In this case, the nodes which prove the apex points of the cell associated with the matching apex point Q1 are the three nodes #11', #16' and #15', whilst the links (connecting links) extended from these nodes to outside the cell associated with the matching apex point Q1 are three links #11'#10', #16'#12' and #15'#2'. On the other hand, there is no redundantly traversed link on the outer periphery of the connection relational graph of the part B after addition of the links #15', #16'.

That is, by adding the links #15', #16', the redundantly traversed links #1' and #2' can cease to be the redundantly traversed links. Moreover, the numbers of the connecting links of the cells associated with the matching apex points P1 and Q1 can be equated to each other, as a result of which the cell associated with the matching apex point P1 can be matched to the cell associated with the matching apex point Q1.

After the end of matching of the cell associated with the matching apex point P1 in the connection relational graph and the matching apex point Q1 in the connection relational graph of the part B, the nodes on the outer periphery of the part A is again followed counterclockwise along the links to detect the link constituting outer periphery of the cell associated with the matching apex point. This cell is matched to a corresponding cell in the connection relational graph of the part B. This operation is repeated until the entire outer periphery of the connection relational graph of the part A is traversed, herein until the node #10 is reached, since the starting point has been the node #10.

Figure 20:
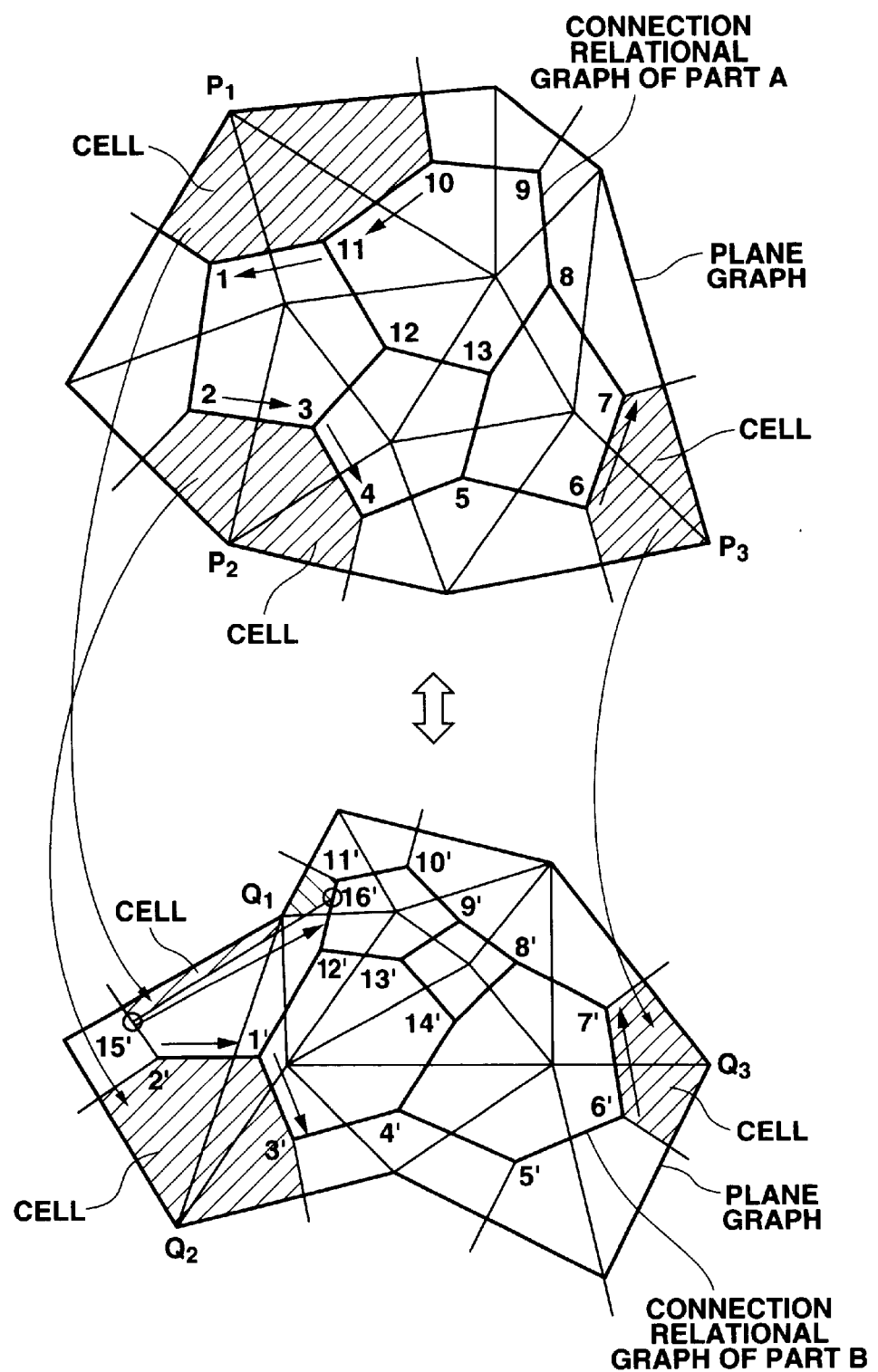
FIG. 20 illustrates matching between cells associated with matched apiece.

Therefore, the links #2#3 and #3#4, interconnecting the nodes #2, #3 and #4, are traversed, as shown in FIG. 20. These links #2#3 and #3#4 constitute the outer periphery of the cell associated with the matching apex point P2. Thus, the cell associated with the matching apex point P2 has now been matched to the cell of the connection relational graph corresponding to the first-stated cell.

That is, the matching apex point of the part B specified as a matching apex point to be matched to the matching apex point P2 of the part A is the apex point Q2, so that the cell associated with the matching apex point P2 has now been matched to the cell matched to the matching apex point Q2.

It is noted that, in the connection relational graph of the part A shown in FIG. 20, the links extended from the nodes #2, #3 and #4 representing the apex points of the cell associated with the matching apex point P2 outwardly of the cell (connecting links) are three links #2#1, #3#12 and #4#5. In the connection relational graph of the part B shown in FIG. 20, the links extended from the nodes #2', #1' and #3' representing the apex points of the cell associated with the matching apex point Q2 outwardly of the cell (connecting links) are three links #2'#15', #1'#12' and #3'#4'.

Therefore, since the numbers of the connecting links are equal, the cell having the matching apex point P2 and the cell associated with the matching apex point Q2 can directly be matched to each other.

If then the outer periphery of the connection relational graph of the part A is followed, the link #6#7, interconnecting the nodes #6, #7, is traversed, as shown in FIG. 20. This link #6#7 constitutes the outer periphery of the cell matched to the matching apex point P3. Therefore, the cell associated with the matching apex point P3 has now been matched to the cell of the connection relational graph of the part B corresponding to the first-stated cell.

That is, the matching apex point in the part B specified as being an apex point to be matched to the matching apex point P3 in the part A is an apex point Q3, so that the cell associated with the matching apex point P3 has now been matched to the cell associated with the matching apex point Q3.

That is, the matching apex point in the part B, specified as being the apex point to be matched to the matching apex point P3 in the part A, is the apex point Q3, so that the cell associated with the matching apex point P3 is matched to the cell associated with the matching apex point Q3.

In the connection relational graph of the part A, shown in FIG. 20, there are two links (connecting links) extending outwardly of the cell associated with the matching apex point P3, namely links #6#5 and #7#8. Also, in the connection relational graph of the part B, shown in FIG. 20, there are two links (connecting links) extending outwardly of the cell associated with the matching apex point Q3, namely links #6'#5' and #7'#8'.

Therefore, since the numbers of the connecting links are equal, the cell associated with the matching apex point P3 can directly be matched to the cell associated with the matching apex point Q3.

Figure 21:
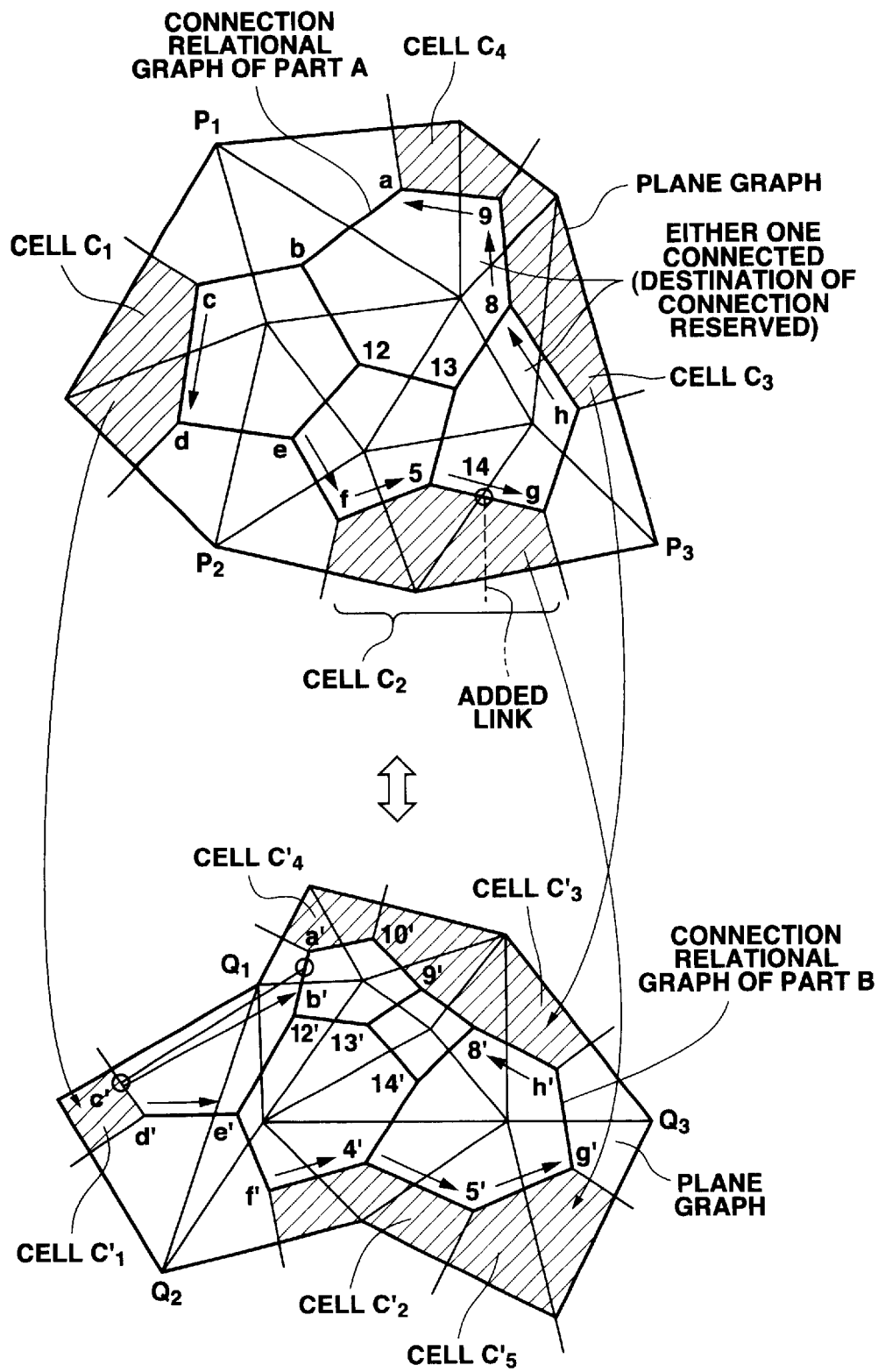
FIG. 21 illustrates matching between cells lying between cells associated with matched apiece.

The nodes as the apex points of the cells, matched in the respective connection relational graphs of the parts A and B, are re-numbered to clarify the relation of the cell matching (results of matching), as shown in FIG. 21. That is, in FIG. 21, the reference symbols of the matched nodes of the two matched cells are changed from the numerical symbols to lower-case alphabetical letters, wherein one of the two matched nodes is indicated only by lower-case alphabetical letters, whilst the other is indicated by the corresponding letters to which are affixed dash marks ('). Thus, the nodes a to h of the connection relational graph of the part A are matched to the nodes a' to h', respectively.

After the end of matching of the cells associated with the matched apex points, as described above, the outer periphery of the connection relational graphs of the parts A and B is followed to match a cell on the outer side of the cell associated with the matched apex point in the connection relational graph of the part A to a cell on the outer side of the cell other than the cell associated with the matched apex point in the connection relational graph of the part B, as shown in FIG. 21.

That is, if the outer periphery of the connection relational graph of the part A is followed, as when the cells associated with the matched apex points are matched to each other, neither the link extended to the outer side of the outer periphery nor the link extended to the inner side thereof is present partway in the path #c#d between the cell associated with the matching apex point P1 and that associated with the matching apex point P2.

On the other hand, if the outer periphery of the connection relational graph of the part B is followed, neither the link extended to the outer side of the outer periphery nor the link extended to the inner side thereof is present partway in the path #c'#d' between the cell matched to the matching apex point Q1 matched to the cell matched to the matching apex point P1 and the cell matched to the matching apex point Q2 matched to the cell matched to the matching apex point P2.

Therefore, the link #c#d in the connection relational graph of the part A is matched to the link #c'#d' in the connection relational graph of the part B, as a result of which two cells, namely a cell C1 on the outer side of the outer periphery between the cell matched to the matching apex point P1 and the cell matched to the matching apex point P2 and a cell C1' on the outer side of the outer periphery between the cell matched to the matching apex point Q1 and the cell matched to the matching apex point Q2, are recognized as being the cells to be matched.

The cells C1 and C1' are matched to each other since these cells are equal in the number of the connection links. In the embodiment of FIG. 21, since the node #c or the node #d constituting the apex points of the cell C1 is matched to the node #c' or the node #d' constituting the apex points of the cell C1', judging from the form of the respective symbols, the cell C1 is evidently matched to the cell C1'. Therefore, in matching the cells C1 to C1', there is no necessity of performing any particular processing (that is, there is no necessity of re-numbering the nodes).

If then the outer periphery of the connection relational graph of the part A is followed, there is a link #5#13 extended from the node #5 to the inner side of the outer periphery partway in a path #f#5#g between the cell matched to the matching apex point P2 and the cell matched to the matching apex point P3.

On the other hand, if the outer periphery of the connection relational graph of the part B is followed, there are a link extended from the node #5' to the outer side of the outer periphery and a link #4'#14' extended from the node #4' to the inner side of the outer periphery partway in a path #f'#4'#5'#g' between a cell matched to the matching apex point Q2 matched to the matching apex point P2 and a cell matched to the matching apex point Q3 matched to the matching apex point P3.

Therefore, the link #f#5#g interconnecting the nodes #f, #5 and #g in the connection relational graph of the part A (or a path defined by the link) is matched to a link #f'#4'#5'#g' interconnecting the nodes #f', #4', #5' and #g' in the connection relational graph of the part B.

If, in the connection relational graph of the part A, the link #f#5#g in the connection relational graph of the part A is followed, a link #5#13 extended from the node #5 to an inner side of the outer periphery is presented partway. On the other hand, if, in the connection relational graph of the part B, the links #f', #4', #5' and #g' are followed, a link #4'#14', extended from the node #4' to an inner side of the outer periphery and a link extended from the node #5' to an outer side of the outer periphery are presented partway in this order.

Therefore, if, after the link #f#5#g is followed, and the link #5#13 extended from the node #5 to the inner side of the outer periphery is subsequently presented, in the connection relational graph of the part A, a node #14 is added as shown in FIG. 21, and a link extended form the node #14 to an outer side of the node #14, indicated by a broken line in FIG. 21, is also added, it becomes possible to match the links in the connection relational graphs of the parts A and B.

Thus, the node #14 and the link extending from the node #14 to an outer side of the outer periphery of the node #14 are added in the connection relational graph of the part A, thus realizing matching of the link #f#5#14#g in the connection relational graph of the part A to the link #f'#4'#5'#g' in the connection relational graph of the part B.

If the node #14 and the link extended from the node #14 to an outer side of the outer periphery are added to the connection relational graph of the part A to match the links, as described above, the cell C2, lying on an outer side of the outer periphery between the cell associated with the matching apex point P2 and the cell associated with the matching apex point P3, is split into two cells.

On the other hand, in the connection relational graph of the part B, there are two cells C2' and C5' on an outer side of the outer periphery between the cell associated with the matching apex point Q2 and the cell with the matching apex point Q3. These cells C2' and C5' are matched respectively to two cells obtained on splitting the cell C2 in the connection relational graph of the part A, because the numbers of the connecting links of these cells (two) are equal to one another.

Figure 22:
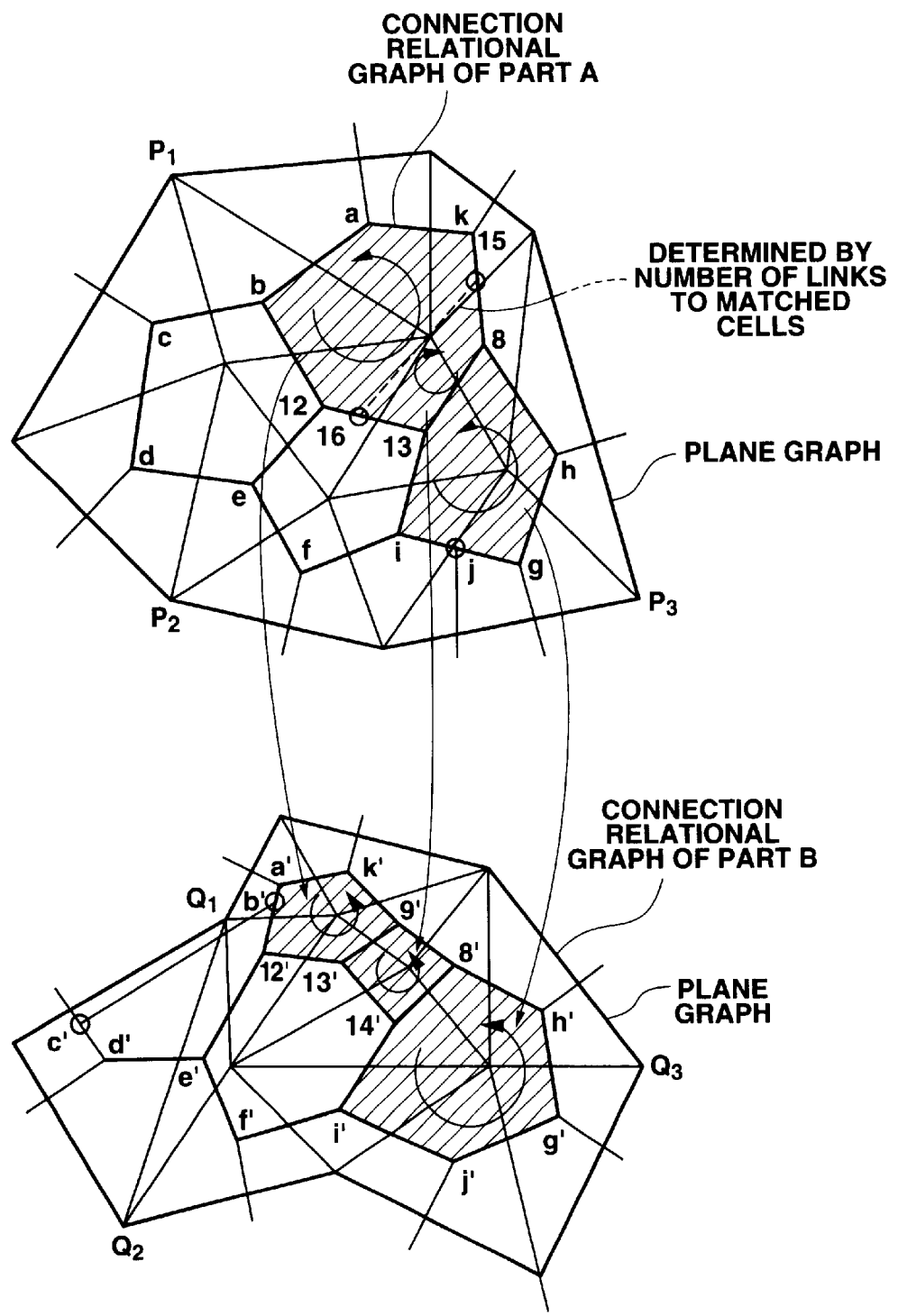
FIG. 22 illustrates a method for determining which of reserved links is to be added.

The result is that the node #5 or #14, constituting the apex points of the matched cells, and which as yet are not re-numbered, are re-numbered to #i or #j, as shown in FIG. 22. Also, the nodes #4' or #5' in the connection relational graph of the part B, matched to the node #5 or #14, are re-numbered to dashed numbers #i or #j of the matched nodes, that is #i' or #j', as shown in FIG. 22.

The link extended from the added node #j, added in FIG. 22 (node #14 in FIG. 21) to an outer side of the outer periphery, is connected to a link of the connection relational graph of a part connected to the part A in the polygon model MA constituted by the part A. That is, matching of the cell of the connection relational graph of the part connected to the part A is effected taking into account the link extended outwardly from the outer periphery from the node #j added in FIG. 22.

If the outer periphery of the part A is followed further, there are present two links, partway in a path #h#8#9#a between the cell associated with the matching apex point P3 and the cell associated with the matching apex point P1, as shown in FIG. 21, namely a link #8#13 extended to an inner side of the outer periphery from the node #8 and a link extended from the node #9 to an outer side of the outer periphery On the other hand, if the outer periphery of the connection relational graph of the part B is followed, there are present three links, partway in a path #h'#8'#9'#10'#a' between a cell associated with the matching apex point Q3 matched to the cell associated with the matching apex point P3 and a cell associated with the matching apex point Q1 matched to the cell associated with the matching apex point P1, namely a link #8'#14' extended from the node #8' to an inner side of the outer periphery, a link #9'#13' extended from the node #9' to an inner side of the outer periphery and a link extended from the node #10' to an outer side of the outer periphery, Thus, a link #h#8#9#a interconnecting the nodes #h, #8, #9 and #a in the connection relational graph of the part A are not matched to the nodes #h', #8', #9' and #a' in the connection relational graph of the part B.

If, in the connection relational graph of the part A, the link #h#8#9#a is followed, a link #8#13 extended from the node #8 to an inner side of the outer periphery and a link extended from the node #9 to an outer side of the outer periphery are presented partway in this order. On the other hand, if, in the connection relational graph of the part B, the link #h'#8'#9'#10'#a' is followed, a link #4'#14' extended from the node #8' to an inner side of the outer periphery, a link #9'#13' extended from the node #9' to an inner side of the outer periphery and a link extended from the node #10' to an outer side of the outer periphery, are presented partway in this order.

Thus, if, in the connection relational graph of the part A, a node is added to the link #h#8 or the link #8#9, and a link extended from the nodes to an inner side of the outer periphery is added, as indicated by a dotted line arrow in FIG. 21, it becomes possible to realize the matching in the connection relational graphs of the parts A and B.

To which of the link #h#8 or the link #8#9 in the connection relational graph of the part A the link in FIG. 21 is to be added may be optionally selected at this time point. This, however, is to be reserved here.

The link added to the link #h#8 or the link #8#9 is a link extended to an inner side of the outer periphery and hence no link is added which is extended to an outer side of the outer periphery. Therefore, this does not affect the numbers of the cell associated with the matching apex point P3 and the cell associated with the matching apex point P1 in the connection relational graph of the part A. Specifically, although there are two cells C3 and C4 on an outer side of the outer periphery between the cell matched to the matching apex point P3 and the cell matched to the matching apex point P1 in FIG. 21, the numbers of the cells are not changed by adding the link on the link #h#8 or the link #8#9.

Also, it is on one of the link #h#8 and the link #8#9 and, at any rate, on the outer periphery of the cell C3, that the link is added in the connection relational graph of the part A. Therefore, although the number of the apex points (nodes) of the cell C3, that is the number of the connection links, is changed, specifically, increased by one, by addition of the link, the number of the connection links of the cell C4 is not changed.

Moreover, no link is added in the connection relational graph of the part B, so that neither the number of the two cells C3', C4' on the outer side of the outer periphery between the cell matched to the matching apex point Q3 and the cell matched to the matching apex point Q1 nor the number of the connection links in FIG. 21 is changed.

Thus, as for the cell C4 on an outer side of the outer periphery neighboring to the cell matched to the matching apex point P1 in the clockwise direction in the connection relational graph of the part A, and the cell C4' on an outer side of the outer periphery neighboring to the cell matched to the matching apex point Q1 in the clockwise direction in the connection relational graph of the part B, the numbers of the connecting links remain unaffected by reserved link addition and are equal to each other (both two). Thus, the cells can be matched to each other at this time point.

The result is that the node #10, not re-numbered, constituting the apex points of the matched cell C4 in the connection relational graph of the part A, is re-numbered to #k in the connection relational graph of the part A, as shown in FIG. 22. Moreover, the node #10' in the connection relational graph of the part B, matched to the node #10, is re-numbered to #k'.

If link addition is reserved, as described above, that is if a reserved link has occurred, attention is directed to the cell where the reserved link has occurred, and a decision is made which of the reserved links is to be added, based on the cell in the connection relational graph where the reserved link has not occurred.

Specifically, reserves links are produced in two cells in the connection relational graph of the part A, namely a cell #5#14#g#h#8#13, that is a cell having the nodes #5, #14, #g, #h, #8 and #13 as apex points, and a cell #a#b#12#13#8#9, that is a cell having the nodes #a, #b, #12, #13, #8 and #9 as apex points.

These reserved links were produced in matching the link #h#8#9#a in the connection relational graph of the part A to the link #h'#8'#9'#9'#a' in the connection relational graph of the part B. In the connection relational graph of the part B, where no reserved links are produced, there are three cells having at least portions of the links #h', #8, '#9, '#10' and #a' as the outer periphery, namely cells #i'#j'#g' #h'#8'#14', #8'#9'#13'#14' and #a'#b'#12'#13'#9'#k'.

If the numbers of the links constituting the outer periphery of the three cells #i'#j'#g'#h'#8'#14', #8'#9'#13'#14' and #a'#b'#12'#13'#9'#k', which is equal to the number of the nodes, these numbers are equal to 6, 4 and 6, respectively.

Thus, in the connection relational graph of the part A in FIG. 21, reserved links are added so that cells having at least portions of the link #h#8#9#a as the outer periphery will prove three cells surrounded by the 6, 4 and 6 links.

If the node #15 is added to the link #8#9, the node #16 is added to the link #12#13 and the a link #15#16 having these two nodes as end points, indicated by broken lines in FIG. 22, is added, as shown in FIG. 22 renumbered from FIG. 21, the link #h#8#k#a in the connection relational graph of the part A proves a link #h#8#15#k#a, as a result of addition of the node #15. It is noted that there are three cells having at least portions of the link #h#8#15#k#a, namely cells #i#j#g#h#8#13, #8#15#16#13 and #a#b#12#16#15#k, these three cells being surrounded by 6,4 and 6 links, respectively.

If, in FIG. 21, a node is added on the link #8#k, a node is added to the link #5#13 and a link having these two nodes as end points is added, there are three cells having at least portions of the link #h#8#9#a (corresponding to the link #h#8#k#a of FIG. 22) as the outer periphery, these cells being surrounded by the 6, 4 and 6 links.

Thus, in the present case, it is possible to add the node #15 on the link #8#k, add the node #16 to the link #12#13 and to add the link #15#16 having the two nodes as end points, as shown in FIG. 22. Alternatively, it is possible to add a node on the link #h#8, add a node on the link #5#13 and to add a link having these two nodes as terminal points. Here, the link #15#16 is added, as shown for example in FIG. 22.

Meanwhile, if the number of links surrounding a cell is not coincident, this case is evaded and a decision is made which of the reserved links is to be added.

By adding the links #15#16, the cells #i#j#g#h#8#13, #8#15#16#13 and #a#b#12#16#15#k and the cells #i'#j'#g'#h'#8'#14', #8'#9'#13'#14' and #a'#b'#12'#13'#9'#k', lying at the same relative positions and surrounded by the same numbers of links in the connection relational graphs of the parts A and B, are equal in the number of the connecting links and hence can be matched respectively to each other, as shown in FIG. 22.

Figure 23:
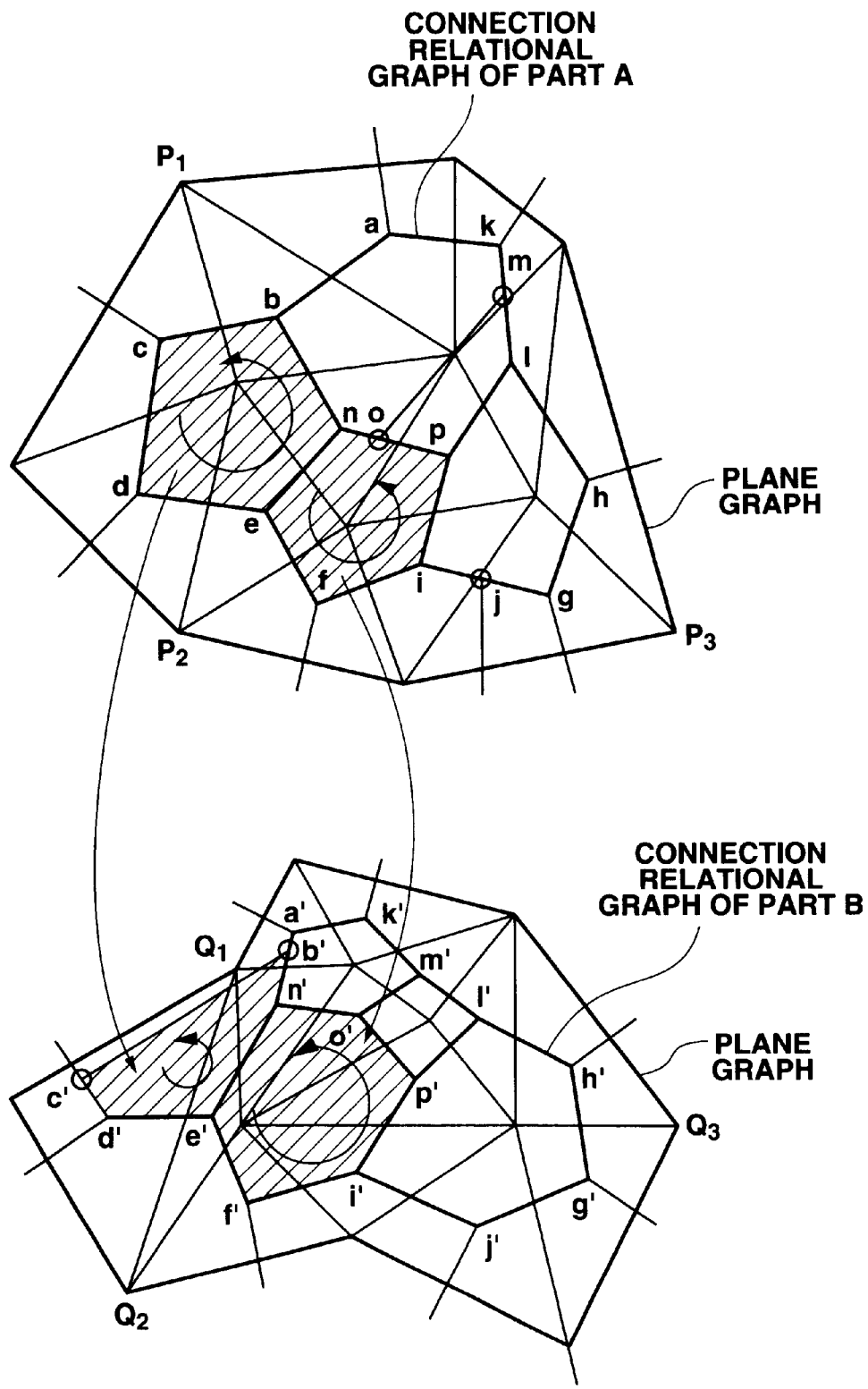
FIG. 23 illustrates matching between cells lying on the inner side of the outer periphery of the connection relational graph.

The result is that the reference symbols of the nodes #8, #15, #12, #16 and #13, not as yet re-numbered and constituting the apex points of the matched cells in the connection relational graph of the part A, are re-numbered to #1, #m, #n, #o and #p, respectively, as shown in FIG. 23. Also, the reference symbols of the nodes #8', #9', #12', #13' and #14', in the connection relational graph of the part B, corresponding to the nodes #8, #15, #12, #16 and #13, are re-numbered to dashed #1, #m, #n, #o and #p, that is #1', #m', #n', #o' and #p', respectively.

After matching all of the cells lying on an outer side of the outer periphery of the connection relational graph and adding reserved links produced at this time, that is after deciding which of the reserved links is to be added and adding the reserved link, attention is directed to an optional one of non-matched cells neighboring to the already matched cells in the connection relational graph of the part A, and a cell of the connection relational graph of the part B to be matched to the cell under consideration. As a link is added as necessary to at least one of the selected cell or the cell under consideration, the cells in the connection relational graphs of the parts A or B are matched to each other. This operation is repeated until the non-matched cells are depleted.

Therefore, after the state shown in FIG. 23 is reached, the cells not as yet matched in the connection relational graph of the part A are two cells, namely cells #b#c#d#e#n and #e#f#i#p#o#n, these two cells being matched to non-matched cells #b'#c'#d'#e'#n' and #e'#f'#i'#p'#o'#n' in the connection relational graph of the part B, respectively. From the relative positions of these cells, the cell #b#c#d#e#n is matched to the cell #b'#c'#d'#e'#n', whilst the cell #e#f#i#p#o#n is matched to the cell #e'#f'#i'#p'#o'#n'.

In the embodiment of FIG. 23, the nodes #b, #c, #d, #e, #f, #i, #n, #o, #p, constituting the cells #b#c#d#e#n and #e#f#i#p#o#n, are known to be matched respectively to the nodes #b', #c', #d', #e', #f', #i', #n', #o', #p' constituting the cells #b'#c'#d'#e'#n' and #e'#f'#i'#p'#o'#n', respectively, as explained in the matching of the cells C1 and C1' in FIG. 21. Thus, there is no necessity of particular processing, that is, there is no necessity of re-numbering the nodes, in matching the cell #b#c#d#e#n and the cell #b'#c'#d'#e'#n' or in matching the cell #e#f#i#p#o#n and the cell #e'#f'#i'#p'#o'#n'.

The matching of the cells in the connection relational graphs of the parts A and B is sequentially performed from the cells on the outer periphery of the connection relational graphs to those on the inner periphery of the connection relational graphs, as described above. When the matching of the totality of the cells has come to a close, the connection relational graphs of the parts A and B are of the same shape, as a two-dimensional graph, such that the polygons of the parts A and B constituted by the polygons, the relation of connection of which is represented by the co-morphic connection relational graphs, are respectively matched to one another.

Figure 24:
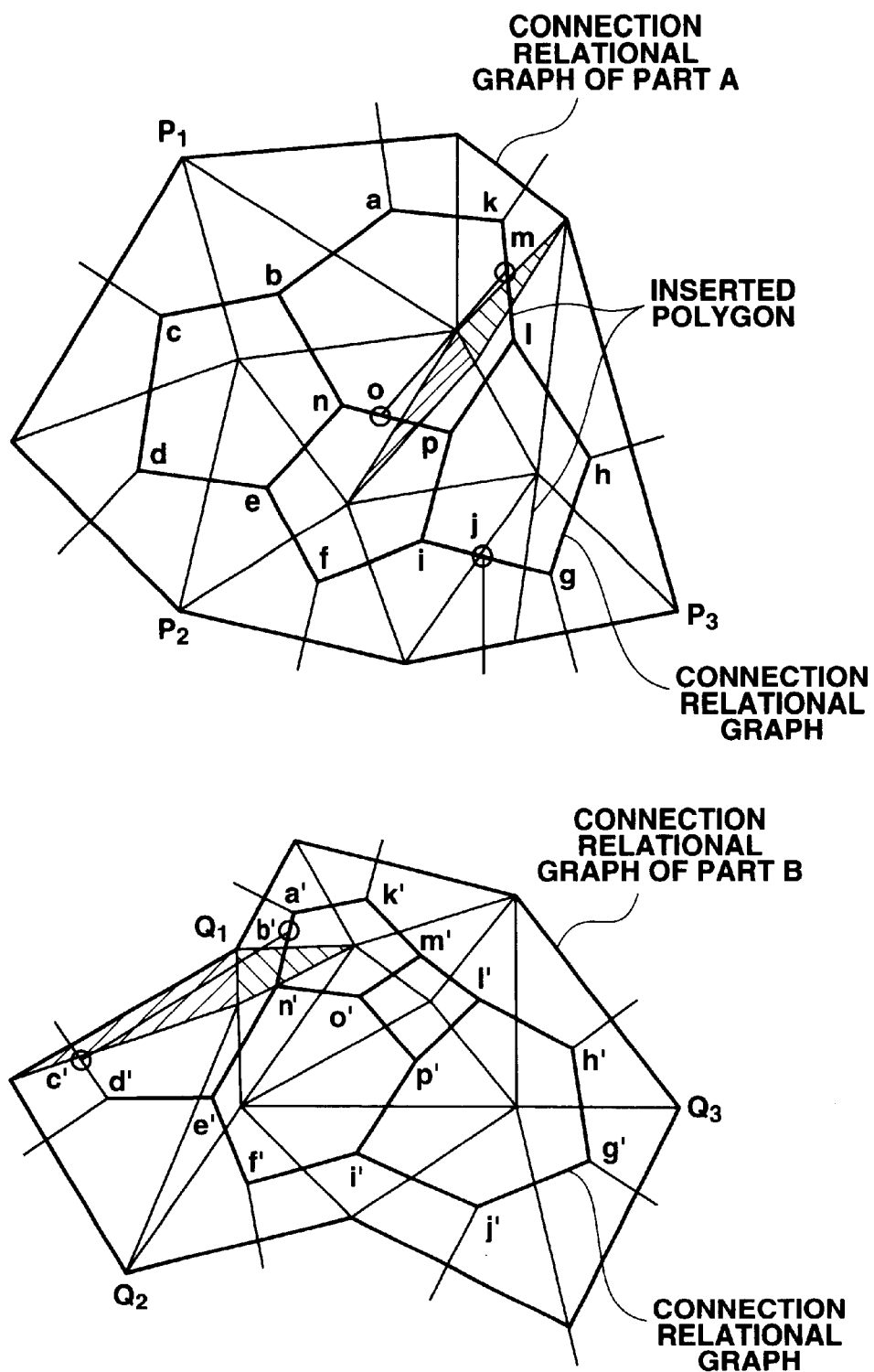
FIG. 24 shows a polygon inserted to render the connection relational graphs co-morphic.

FIG. 24 shows plane graphs of the connection relational graphs of the parts A and B which have become co-morphic as described above.

By the connection relational graphs of the parts A and B becoming co-morphic, three polygons are inserted into the plane graph of the part A, whilst two polygons are inserted into the plane graph of the part B, as shown shaded in FIG. 24.

That is, as may be understood from comparison of FIG. 17 prior to the respective connection relational graphs becoming co-morphic and FIG. 23 after the connection relational graphs becoming co-morphic, three nodes #j, #m and #o are added in the connection relational graph of the part A, whilst two nodes #b' and #c' are added in the connection relational graph of the part B. Since the nodes in the connection relational graph represent a polygon, three polygons and two polygons have now been inserted into the parts A and B, respectively. Meanwhile, the polygons inserted into the parts are polygons with an area 0, as discussed above.

Figure 25:
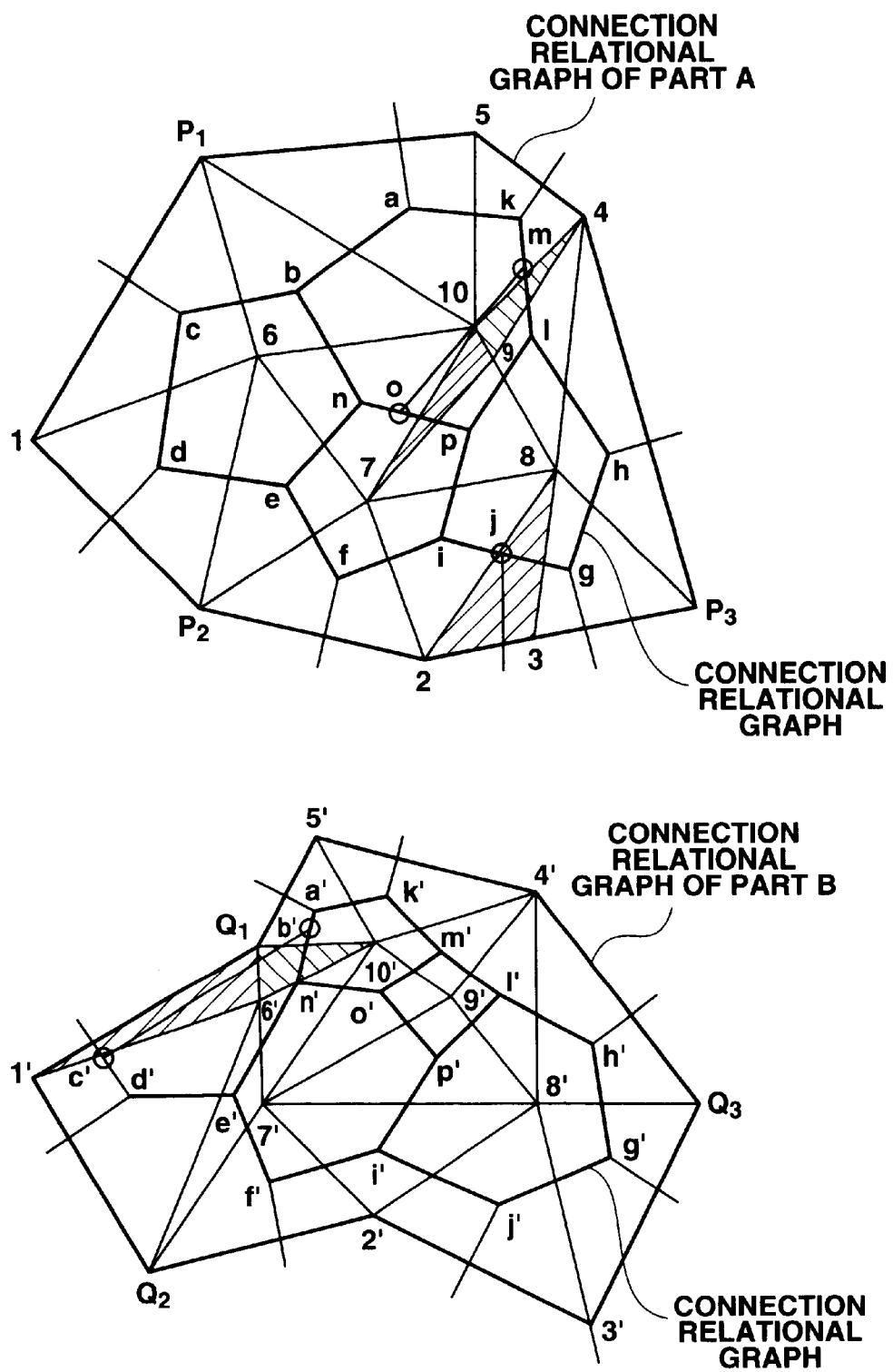
FIG. 25 shows a plane graph of parts the polygons of which are matched to one another.

The respective apex points of the polygons, corresponding to the cells matched in the connection relational graphs of the parts A and B, are numbered to clarify the matching relation, as shown in FIG. 25. Specifically, the reference symbols of the apex points apex points of one of the two matched cells are denoted solely by numerical figures, while those of the other matched cell are denoted by the corresponding dashed numerical figures. Thus, in FIG. 25, the apex points #1, #2, #3, #4, #5, #6, #7, #8, #9 and #10 of the polygons of the part A are matched to the #1', #2', #3', #4', #5', #6', #7', #8', #9' and #10' of the part B, respectively. Meanwhile, the matching apex points P1 to P3 of the part A are obviously matched to the matching apex points Q1 to Q3 of the part B, judging from the fact that these points are specified by the graphics designer. Therefore, the reference symbols are not changed in FIG. 25.

Figure 26:
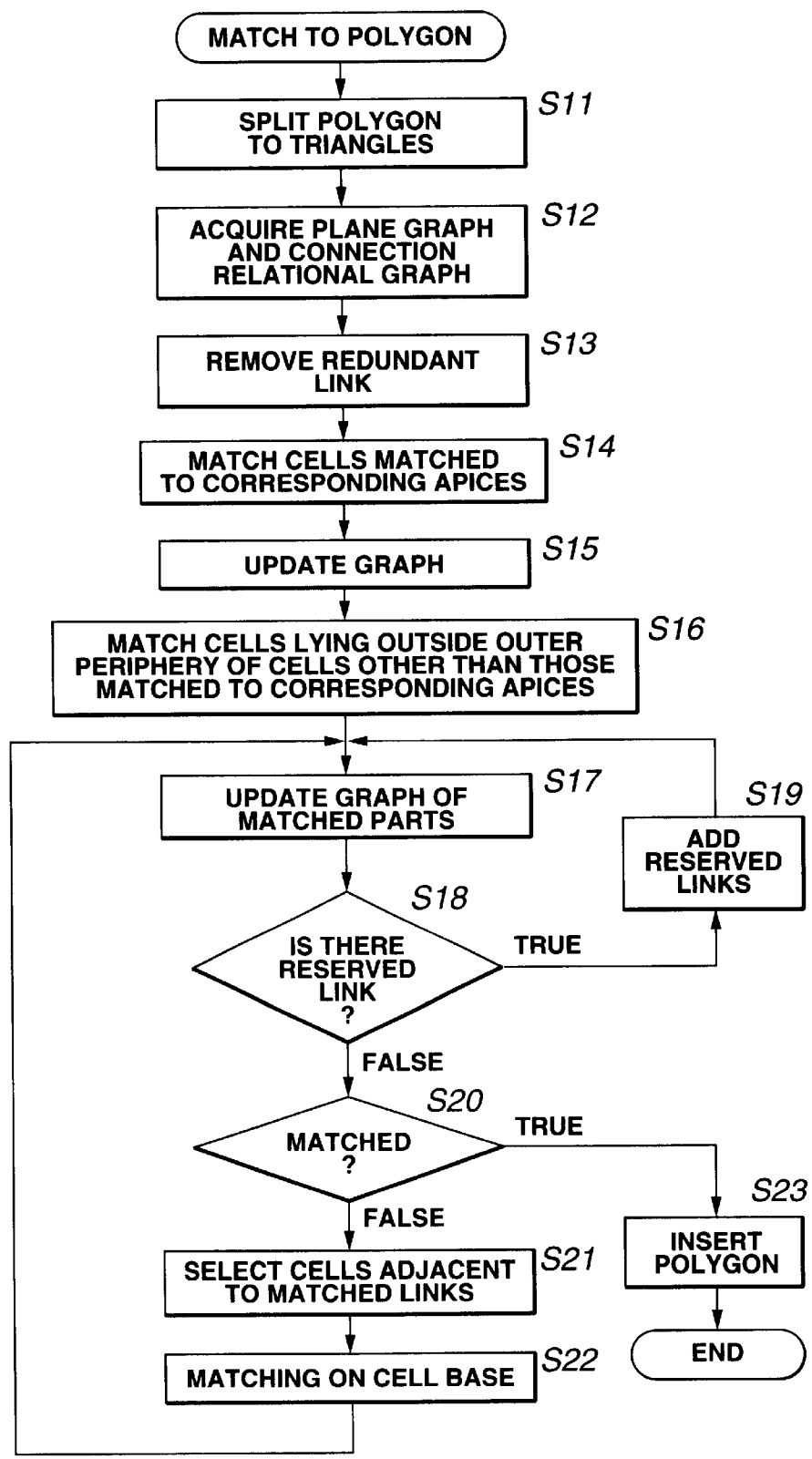
FIG. 26 is a flowchart for illustrating conventional processing of model matching.

Referring to the flowchart of FIG. 26, the polygon matching executed at step S3 of FIG. 7 is further explained.

In the polygon matching, the two parts to be matched to each other are split at step S11 into polygons so that the respective polygons are constituted solely by triangles. The program then moves to step S12. If the parts are constituted solely by triangular polygons from the outset, the processing of step S11 is skipped.

At step S12, plane graphs of the two matched parts are prepared and, based on these plane graphs, connection relational graphs are prepared. The program then moves to step S13. If redundantly traversed links are present in the connection relational graphs of the two parts prepared at step S12, the redundantly traversed links are deleted as described above. The program then moves to step S14. At this step S14, the cells associated with the matching apex points are matched, in the respective connection relational graphs of the matched two parts. The program then moves to step S15, where the node symbols are re-numbered, based on the results of matching, to update the connection relational graphs.

The program then moves to step S16 where cells on an outer side of the outer periphery, other than the cells matched to the matching apex points, in the connection relational graphs of the two parts, are matched. The program then moves to step S17 to update the connection relational graphs based on the results of the matching.

The program then moves to step S18 to check whether or not there is any reserved link in the connection relational graph. If the result of the check indicates the presence of the reserved link, the program moves to step S19 to decide which of the reserved links is to be added, based on the cell in the connection relational graph not having the reserved link. The cells which could not be matched by the reserved link are matched to each other. The program reverts to step S17 to update the connection relational graph based on the result of the matching.

If the result of check at step S18 indicates that no reserved link exists in the connection relational graph, the program moves to step S20 to check whether or not all the cells in the two connection relational graphs have been matched. If it is verified at step S20 that all the cells in the two connection relational graphs have not been matched, the program moves to step S21 to select a non-matched cell neighboring to the already matched cell from one of the two connection relational graphs. The program then moves to step S22 to match the cell to a cell of the other connection relational graph. The program reverts to step S17 to update the connection relational graphs based on the results of the matching.

If the results of check at step S20 indicate that the matching has been completed in the totality of the cells in the two connection relational graphs, that is if the two connection relational graphs are co-morphic, the program moves to step S23 where area 0 polygons are inserted into the matched parts, based on the respective two connection relational graphs, and the reference symbols of the apex points of the respective polygons are affixed to clarify the relation of matching between the polygons, before returning.

The polygons constituting the polygon model MA or the polygonal model MB are matched to one another as described above, and the morphed animation is prepared by deforming the matched polygons, the morphed animation can be used as a portion of the keyframe animation.

Thus, by preparing an animation of a rabbit moving its mouth in synchronism with audio data, and an animation of a horse moving its mouth in synchronism with audio data, and by preparing the morphed animation of the rabbit being transformed to a horse, it is possible to realize an animation in which an animation of a talking rabbit is smoothly transformed to a talking horse.

Since the polygon model MA and the polygonal model MB are split into parts and polygon matching is effected for each set of matched parts A and B, it is possible to perform the morphing deformation of a part of the polygon model MA to a desired part B of the polygonal model MB. That is, in the morphing from a rabbit shape to a horse shape, the ear and the eye of a rabbit can be smoothly deformed to the ear and the eye of the horse, respectively, as shown in FIG. 4.

Moreover, since the polygon cells of the connection relational graphs of the two parts are matched to each other, and made equal in shape as the two-dimensional graph, polygon matching can be performed easily.

There is also no risk of the model texture or material being blended or of the model features being lost, as occurs in the morphing by projecting the model on e.g., a spherical surface.

In the preferred embodiment, the morphed animation is prepared by having a computer program executed by the information processing device (CPU 2). It is however possible to have the morphed animation executed by a dedicated hardware.

In the present embodiment, the computer program, executed by the CPU 2, is stored in the external storage device 7 and furnished in this form. However, the computer program can also be furnished over a transmission medium, such as Internet, terrestrial waves, satellite network, public network or cable television network (CATV).

Also, in the present embodiment, the matching apex points are specified by a graphics designer. However, the matching apex points can also be optionally specified by the computer graphics system. However, in this case, it may be an occurrence that certain portions of one of the models be deformed by the morphing to a portion other than a target portion of the other model, that is that the morphing that has been effected is not in keeping with the graphic designer's intention.

In the present embodiment, the polygon model is split into plural parts for polygon matching. Alternatively, polygon matching may be effected for the original unsplit polygon model.

Also, in the present embodiment, the cells matched to the matching apex points are matched and subsequently the cell-to-cell matching is performed from the outer periphery to the inner periphery of the connection relational graph. However, there is no particular limitation to the cell matching sequence. That is, although the connection relational graphs need to be co-morphic to match the polygons. There is, however, no limitation as to which sequence of operations should be used to make the connection relational graphs co-morphic relative to each other.

In the present embodiment, the polygons making up a three-dimensional model are matched. It is however possible to match polygons making up two-dimensional models.

Moreover, in the present embodiment, polygons making up a part are turned into solely triangular polygons, which then are subjected to matching. However, polygon matching can be effected if a part is made up solely of polygons other than triangular polygons. For example, square-shaped or pentagonal polygons or plural sorts of polygons, such as triangular and square polygons, may be used.

Although triangular polygons are inserted in the present embodiment, it is also possible to insert square-shaped or pentagonal polygons. However, if polygons other than the triangular polygons, namely square-shaped or pentagonal polygons, are used, constraint may be imposed on the inserting positions due to the necessity of forming a node from which are extended four or five links.

What is claimed is:

1. A data processing apparatus for performing data processing of matching unit figures making up a first three-dimensional model and unit figures making up a second three-dimensional model, comprising:
    part splitting means for splitting each of said first and second three-dimensional models into corresponding parts, each presenting a continuous boundary line;
    unit figure matching means for matching unit figures making up said first three-dimensional model and unit figures making up said second three-dimensional model; and
    reconstructing means for reconstructing said parts obtained from unit figure matching into said first and second three-dimensional models, so as to effect morphed animation between said first and second three-dimensional models.

2. The data processing apparatus according to claim 1 wherein if the boundary line of said part is not continuous, said part splitting means adds a boundary line along a ridge line of a unit figure constituting the part to render the boundary of the part continuous.

3. The data processing apparatus according to claim 1 further comprising:
    unit figure splitting means for splitting a unit figure other than a triangular unit figure into triangular unit figures.

4. The data processing apparatus according to claim 1 wherein
    said unit figure matching means includes
        unit figure connection relational graph formulating means for formulating a unit figure connection relational graph which renders the connection relation between unit figures constituting said part into a graphic form;
        said unit figure matching means performing said unit figure matching based on said unit figure connection relational graph.

5. The data processing apparatus according to claim 4 wherein
    said unit figure matching means further includes
        apex point connection relational graph formulating means for formulating the connecting relational graph which renders the connecting relation between apex points of unit figures making up said part;
        said unit figure connection relational graph formulating means formulating said unit figure connection relational graph based on said apex point connection relational graph.

6. The data processing apparatus according to claim 5 wherein
    said apex point connection relational graph formulating means projects a part on a pre-set plane to formulate said apex point connection relational graph as the relation between the apex point of the unit figure constituting said part and a ridge line is maintained.

7. The data processing apparatus according to claim 4 wherein
    said unit figure matching means renders the unit figure connection relational graphs of said first and second three-dimensional models co-morphic to effect matching of said unit figures.

8. The data processing apparatus according to claim 4 wherein
    said unit figure matching means inserts an area zero unit figure to one of said first and second parts of said three-dimensional model, based on said unit figure connection relational graph, for matching to a unit figure constituting the other part.

9. The data processing apparatus according to claim 8 wherein
    said unit figure connection relational graph is made up of nodes representing a unit figure and a link representing connection between said unit figures;
    said unit figure matching means adding a link in a cell which is an area surrounded by said links to insert an area zero unit figure to said part.

10. The data processing apparatus according to claim 9 wherein
    said unit figure matching means inserts a link so that the numbers of links connected to the cells in said unit figure connection relational graphs in the first and second three-dimensional models will be equal to each other.

11. The data processing apparatus according to claim 4 wherein
    said unit figure connection relational graph is made up of nodes representing a unit figure and a link representing connection between said unit figures;

said unit figure matching means matches cells which are areas surrounded by said links in said unit figure connection relational graphs in the parts of said first and second three-dimensional models to effect said unit figure matching.

12. The data processing apparatus according to claim 11 wherein
if apex points to be matched are specified for parts of said first and second three-dimensional models, said unit figure matching means matches said cells associated with said apex points and subsequently matches other cells to effect said unit figure matching.

13. The data processing apparatus according to claim 11 wherein
said unit figure matching means matches said cells in a sequence proceeding from the outer periphery towards the inner periphery of said unit figure connection relational graphs in the parts of said first and second three-dimensional models.

14. The data processing apparatus according to claim 11 wherein
if, when nodes lying on an outer peripheral side of said unit figure connection relational graphs in the parts of said first and second three-dimensional models are followed along said links, there is any link traversed redundantly, said unit figure matching means deletes the redundantly traversed link by adding another link.

15. A data processing method for performing data processing of matching unit figures making up a first three-dimensional model and unit figures making up a second three-dimensional model, comprising:
a part splitting step of splitting each of said first and second three-dimensional models into corresponding parts, each presenting a continuous boundary line;
a unit figure matching step of matching unit figures making up said first three-dimensional model and unit figures making up said second three-dimensional model; and
a reconstructing step of reconstructing said parts obtained from unit figure matching into said first and second three-dimensional models, so as to effect morphed animation between said first and second three-dimensional models.

16. An information furnishing medium for furnishing the control information for causing an information processing apparatus to perform data processing of matching unit figures making up a first three-dimensional model to unit figures making up a second three-dimensional model, wherein
the information furnishing medium furnishes the control information comprising:
a part splitting step of splitting each of said first and second three-dimensional models into corresponding parts, each presenting a continuous boundary line;
a unit figure matching step of matching unit figures making up a part of said first three-dimensional model and unit figures making up a part of said second three-dimensional model; and
a reconstructing step of reconstructing said parts obtained from unit figure matching into said first and second three-dimensional models, so as to effect morphed animation between said first and second three-dimensional models.

17. An information furnishing medium for furnishing the results of data processing of matching unit figures making up a first three-dimensional model and unit figures making up a second three-dimensional model, wherein the information furnishing medium furnishes the results of reconstruction of said first and second three-dimensional models obtained on
splitting said first and second three-dimensional models into corresponding parts, each presenting a continuous boundary line;
performing unit figure matching of matching unit figures constituting parts making up said first three-dimensional model to unit figures constituting parts making up said second three-dimensional model; and
reconstructing said parts obtained from said unit figure matching into said first and second three-dimensional models, so as to effect morphed animation between said first and second three-dimensional models.

18. A data processing apparatus for performing data processing of formulating an animation from first and second three-dimensional models, each defined by an assembly of unit figures, comprising:
part splitting means for splitting each of said first and second three-dimensional models into corresponding parts, each presenting a continuous boundary line;
unit figure matching means for performing unit figure matching of matching unit figures constituting said first three-dimensional model to unit figures constituting said second three-dimensional model; and
animation formulating means for formulating a morphed animation from said first and second three-dimensional models obtained from said unit figure matching, so as to effect the morphed animation between said first and second three-dimensional models.

19. The data processing apparatus according to claim 18 further comprising:
part splitting means for splitting said first and second three-dimensional models into corresponding parts;
said unit figure matching means performing said unit figure matching from one part to another.

20. The data processing apparatus according to claim 19 further comprising:
reconstructing means for reconstructing said parts from the unit figure matching into said first and second three-dimensional models;
said animation formulating means formulating an animation from the reconstructed first and second three-dimensional models.

21. The data processing apparatus according to claim 19 wherein
said unit figure matching means includes
unit figure connection relational graph formulating means for formulating a unit figure connection relational graph;
said unit figure matching being performed based on said unit figure connection relational graph.

22. The data processing apparatus according to claim 21 wherein
said unit figure matching means renders said unit figure connection relational graphs of said first and second three-dimensional models co-morphic to effect said unit figure matching.

23. The data processing apparatus according to claim 18 wherein
said animation formulating means formulates an animation by changing the shape of a unit figure constituting one of said first and second three-dimensional models into a unit figure of the other three-dimensional model matched to the first-stated unit figure.

24. A data processing method for performing data processing of formulating an animation from first and second three-dimensional models, each defined by an assembly of unit figures, comprising:
 a part splitting step of splitting each of said first and second three-dimensional models into corresponding parts, each presenting a continuous boundary line;
 a unit figure matching step of performing unit figure matching of matching unit figures constituting said first three-dimensional model to unit figures constituting said second three-dimensional model; and
 an animation formulating step of formulating a morphed animation from said first and second three-dimensional models obtained from said unit figure matching, so as to effect the morphed animation between said first and second three-dimensional models.

25. An information furnishing medium for furnishing the control information for causing an information processing apparatus to perform data processing of formulating an animation from first and second three-dimensional models, each defined by an assembly of unit figures, comprising:
 a part splitting step of splitting each of said first and second three-dimensional models into corresponding parts, each presenting a continuous boundary line;
 a unit figure matching step of performing unit figure matching of matching unit figures constituting said first three-dimensional model to unit figures constituting said second three-dimensional model; and
 an animation formulating step of formulating a morphed animation from said first and second three-dimensional models obtained from said unit figure matching, so as to effect the morphed animation between said first and second three-dimensional models.

26. An information furnishing medium for furnishing the results of data processing of formulating an animation from first and second three-dimensional models, each defined by an assembly of unit figures, wherein
 the information furnishing medium furnishes animation data obtained on
 splitting each of said first and second three-dimensional models into corresponding parts, each presenting a continuous boundary line;
 performing unit figure matching of matching unit figures constituting said first three-dimensional model to unit figures constituting said second three-dimensional model; and
 formulating a morphed animation from said first and second three-dimensional models obtained from said unit figure matching, so as to effect the morphed animation between said first and second three-dimensional models.

* * * * *